(12) United States Patent
Yamamoto

(10) Patent No.: US 11,592,730 B2
(45) Date of Patent: Feb. 28, 2023

(54) PROJECTION DEVICE AND PROJECTION SYSTEM

(71) Applicant: FUJIFILM Corporation, Tokyo (JP)

(72) Inventor: Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

(21) Appl. No.: 17/402,330

(22) Filed: Aug. 13, 2021

(65) Prior Publication Data

US 2022/0066297 A1 Mar. 3, 2022

(30) Foreign Application Priority Data

Aug. 27, 2020 (JP) .............................. JP2020-143524

(51) Int. Cl.
 *G03B 21/14* (2006.01)
 *G02B 5/00* (2006.01)
 *G03B 37/04* (2021.01)

(52) U.S. Cl.
 CPC ............. *G03B 21/14* (2013.01); *G02B 5/005* (2013.01); *G03B 37/04* (2013.01)

(58) Field of Classification Search
 CPC ......... G02B 5/005; G02B 13/16; G03B 21/14
 See application file for complete search history.

(56) References Cited

U.S. PATENT DOCUMENTS 10,782,510 B2  9/2020  Mori et al.
10,897,603 B2  1/2021  Inoue et al.

FOREIGN PATENT DOCUMENTS

JP  2017-215419 A  12/2017
JP  2020-016857 A  1/2020

*Primary Examiner* — Ryan D Howard
(74) *Attorney, Agent, or Firm* — Studebaker & Brackett PC

(57) ABSTRACT

The projection device includes a display element that displays an image, a projection optical system that forms an intermediate image of the image within an air space and projects the intermediate image to form a projected image, and a light shielding member that is disposed within the air space. The light shielding member includes a light shielding region which is positioned outside optical paths of all effective luminous fluxes emitted from the display element and used to form the projected image. The projection device satisfies a predetermined conditional expression.

20 Claims, 20 Drawing Sheets

FIG. 15
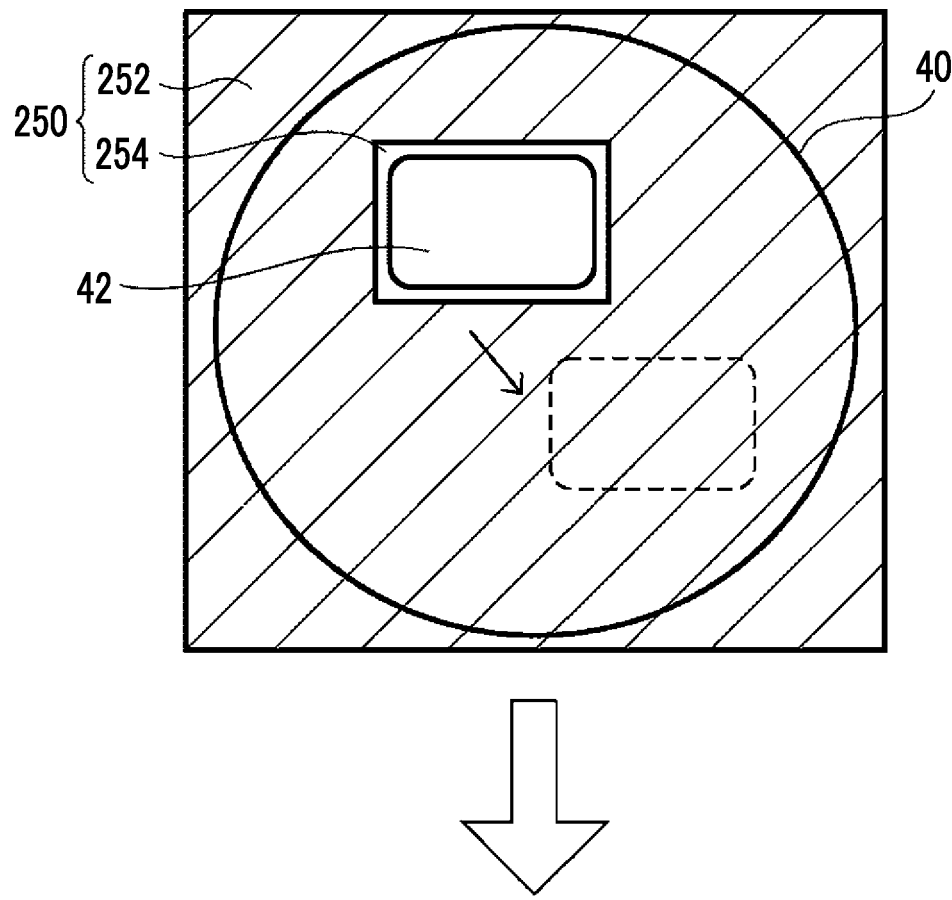
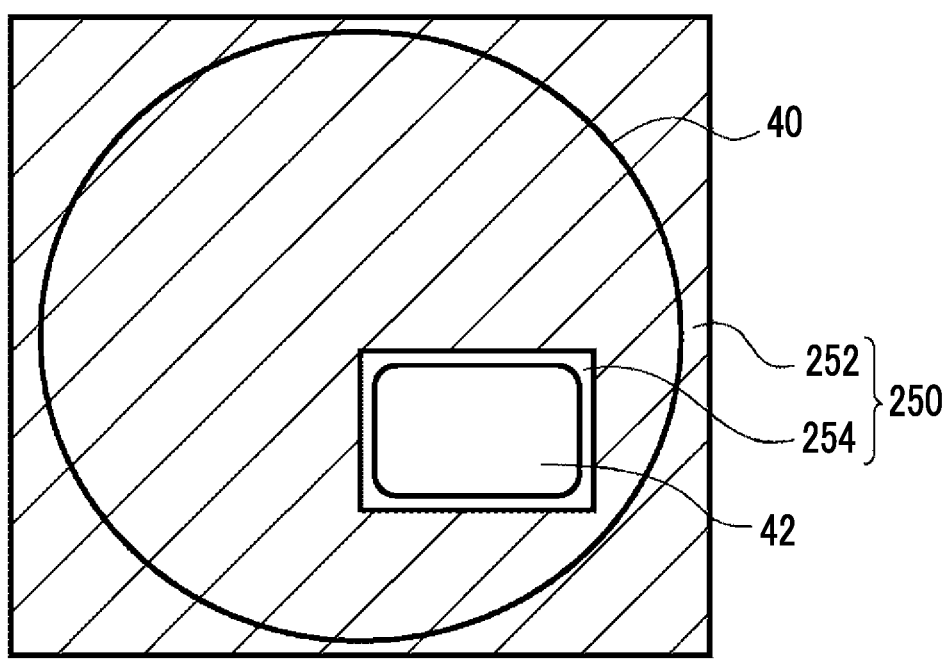

PROJECTION DEVICE AND PROJECTION SYSTEM

CROSS-REFERENCE TO RELATED APPLICATION

The present application claims priority under 35 U.S.C. § 119 to Japanese Patent Application No. 2020-143524, filed on Aug. 27, 2020. The above application is hereby expressly incorporated by reference, in its entirety, into the present application.

BACKGROUND

Technical Field

The presently disclosed technology relates to a projection device and a projection system.

Related Art

JP2017-215419A discloses a projection optical system comprising a first optical system that forms an intermediate image, a light shielding mask provided at an image-forming position of the intermediate image, and a second optical system that projects the intermediate image in an enlarged manner. A light shielding region due to the light shielding mask includes a region that does not overlap with the intermediate image within a range of a circular effective image-forming region centered on an optical axis of the first optical system at the image-forming position of the intermediate image.

JP2020-016857A discloses a projection type display device comprising an imaging element, a light source, a light valve, and an image-forming optical system. The image-forming optical system comprises a first optical system that comprises at least one lens and is shared for projection and imaging, a second optical system that comprises at least one lens and is used only for projection, a third optical system that comprises at least one lens and is used only for imaging, and a separating member that separates an optical path from the second optical system toward the first optical system and an optical path from the first optical system toward the third optical system. The third optical system comprises a first light shielding member that shields a part of luminous flux in the vicinity of a stop position of the third optical system.

SUMMARY

One embodiment according to the presently disclosed technology provides a projection device and a projection system capable of reducing stray light while suppressing an increase in a size of a device.

A first projection device according to the present disclosure comprises a display element that displays an image, a projection optical system that forms an intermediate image of the image within an air space and projects the intermediate image to form a projected image, and a light shielding member that is disposed within the air space, in which the light shielding member includes a light shielding region which is positioned outside optical paths of all effective luminous fluxes emitted from the display element and used to form the projected image, and a light transmission region which is surrounded by the light shielding region and through which the effective luminous flux is transmitted, and in a case in which an area of the light transmission region is defined as STr and an area of a display region of the display element is defined as SD, Conditional Expression (1) below is satisfied.

$$0.25 < STr/SD < 9 \tag{1}$$

In the first projection device according to the present disclosure, it is preferable that Conditional Expression (1-1) below be satisfied.

$$0.4 < STr/SD < 7 \tag{1-1}$$

In the first projection device according to the present disclosure, it is preferable that in a case in which an area of the effective luminous flux in a plane parallel to the light transmission region at a position at which the light shielding member is disposed is defined as SLF, Conditional Expression (2) below be satisfied and Conditional Expression (2-1) below be satisfied.

$$0.5 < SLF/STr < 1 \tag{2}$$

$$0.7 < SLF/STr < 1 \tag{2-1}$$

In the first projection device according to the present disclosure, it is preferable that in a case in which a distance between a position of the light shielding member and a paraxial image-forming position of the intermediate image in an optical axis direction of the projection optical system is defined as D and a diameter of an image circle on a reduction side of the projection optical system is defined as IM, Conditional Expression (3) below be satisfied and Conditional Expression (3-1) below be satisfied.

$$0 \le D/IM < 1.5 \tag{3}$$

$$0 \le D/IM < 1.2 \tag{3-1}$$

In the first projection device according to the present disclosure, it is preferable that the area of the light transmission region be set depending on a relative positional relationship between the display element and the projection optical system.

A second projection device according to the present disclosure comprises a display element that displays an image, a projection optical system that forms an intermediate image of the image within an air space and projects the intermediate image to form a projected image, and a light shielding member that is disposed within the air space and includes a light shielding region which is positioned outside optical paths of all effective luminous fluxes emitted from the display element and used to form the projected image, in which in a case in which a distance between a position of the light shielding member and a paraxial image-forming position of the intermediate image in an optical axis direction of the projection optical system is defined as D and a diameter of an image circle on a reduction side of the projection optical system is defined as IM, Conditional Expression (3) below is satisfied.

$$0 \le D/IM < 1.5 \tag{3}$$

In the second projection device according to the present disclosure, it is preferable that Conditional Expression (3-1) below be satisfied.

$$0 \le D/IM < 1.2 \tag{3-1}$$

Hereinafter, in this section, the first projection device and the second projection device according to the present disclosure are collectively referred to as the projection device according to the present disclosure. In the projection device according to the present disclosure, it is preferable that a relative position between at least a part of the projection optical system and the display element be variable.

In the projection device according to the present disclosure, it is preferable that a position of the light shielding member be variable.

In the projection device according to the present disclosure, it is preferable that a position of the light shielding member be set depending on a relative position between the display element and the projection optical system.

In the projection device according to the present disclosure, the light shielding member may be able to change a position of the light shielding region by making a light transmittance variable, and the position of the light shielding member be set depending on a relative position between the display element and the projection optical system while the position of the light shielding region is fixed.

In the projection device according to the present disclosure, the light shielding member may have a curved shape.

A projection system according to the present disclosure comprises a plurality of the projection devices according to the present disclosure and a control device that performs control of linking the plurality of projection devices according to the present disclosure.

BRIEF DESCRIPTION OF THE DRAWINGS

FIG. 15 is a diagram for explaining the disposition of a light shielding member of another modification example in a case in which the position of the effective luminous flux is changed.

DESCRIPTION OF EMBODIMENTS

Hereinafter, an example of an embodiment of a presently disclosed technology will be described with reference to the drawings.

In the description in the present specification, "parallel" or "perpendicular", respectively, include perfectly parallel or perfectly perpendicular, as well as substantially parallel or substantially perpendicular including generally tolerable errors in the technical field to which the presently disclosed technology belongs.

Figure 1:
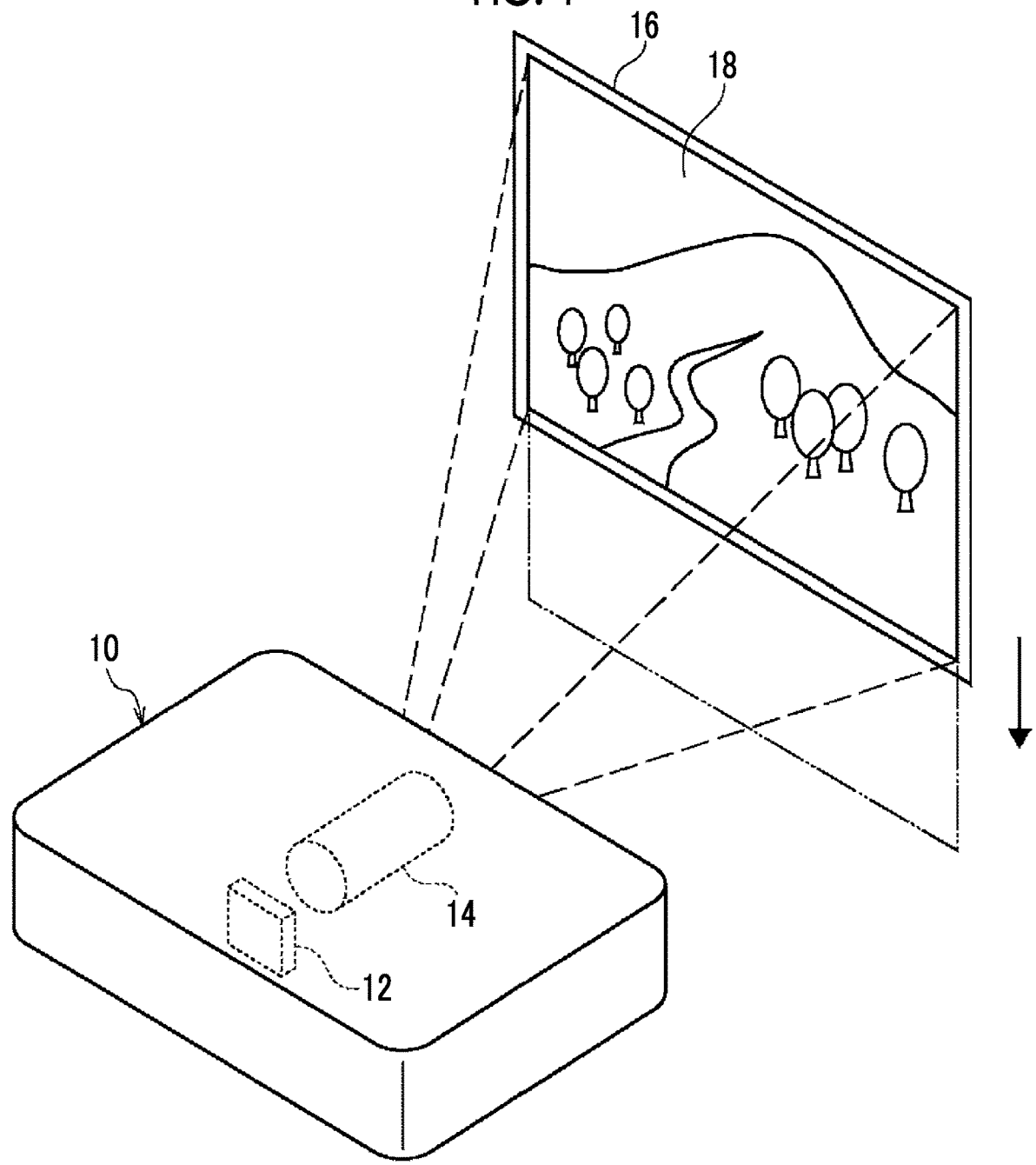
FIG. 1 is a diagram schematically showing a usage state of a projection device.

FIG. 1 shows a usage state of a projection device 10 according to an embodiment of the presently disclosed technology. FIG. 1 conceptually shows a display element 12 and a projection unit 14 which are provided in the projection device 10. The display element 12 displays an image. The projection unit 14 projects an enlarged image of the image displayed by the display element 12 on a screen 16 as a projected image 18. A position of the projected image 18 can be adjusted by a lens shift mechanism 22 described below.

The screen 16 means a target object on which the projected image 18 is projected. The screen 16 may be a dedicated screen, as well as a wall surface of a room, a floor surface, a ceiling, or the like. Further, in a case in which the projection device 10 is used outdoors, the outer wall of the building and the like are also included in the examples of the screen 16.

Figure 2:
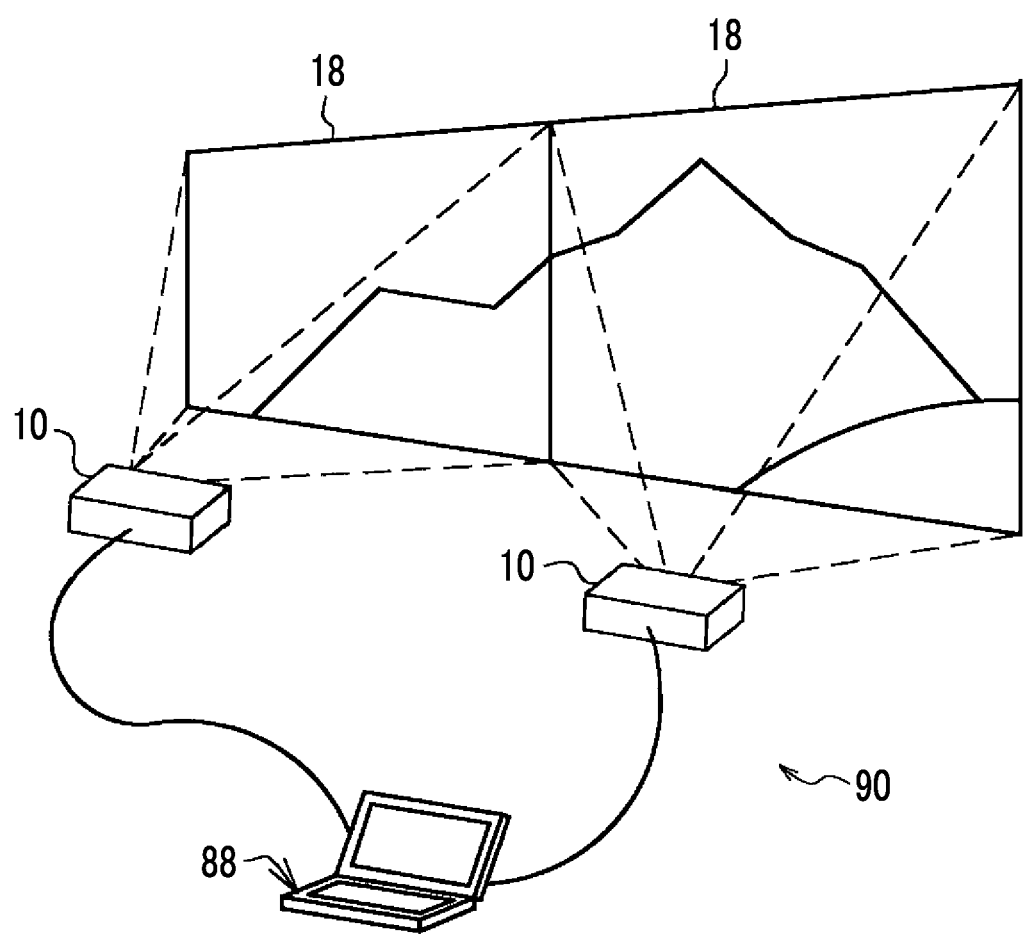
FIG. 2 is a diagram schematically showing another usage state of the projection device.

FIG. 2 shows another usage state of the projection device 10. FIG. 2 shows an example in which a projection system 90 is configured by combining two projection devices 10 and a computer 88. The projection system 90 is used, for example, for so-called blending projection in which a plurality of the projected images 18 are connected and projected. The computer 88 is an example of a "control device"

according to the presently disclosed technology. The computer 88 performs control of linking two projection devices 10, and projects two projected images 18 formed by two projection devices 10 in association with each other.

As shown in FIG. 2, for example, the computer 88 can generate a connection image having a screen size twice that of one projected image 18 by adjoining projected positions of two projected images 18. Data of the plurality of projected images 18 that are the constituent elements of the connection image is output from, for example, the computer 88 to each projection device 10. By using a plurality of the projection devices 10, an image having a large screen size can be projected. The control performed by the computer 88 is not limited to the above example, and various modes can be adopted. For example, two projected images 18 may be disposed such that at least a part of the projected image 18 is overlapped, or a relative position between two projected images 18 may be changed with time. Although FIG. 2 shows an example in which the projection system 90 comprises two projection devices 10, the projection system 90 may comprise three or more projection devices 10.

Figure 3:
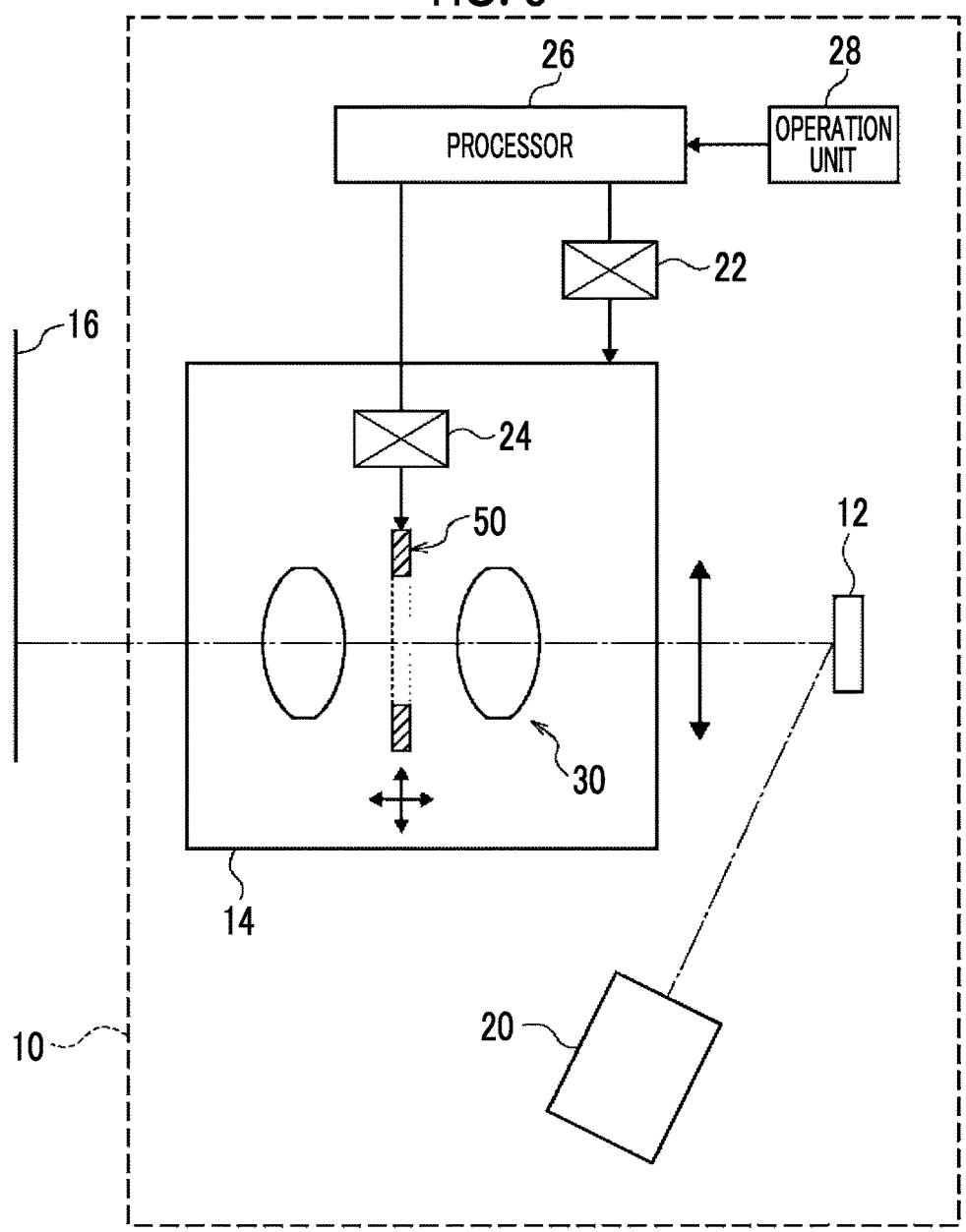
FIG. 3 is a schematic configuration diagram of the projection device according to an embodiment.

FIG. 3 schematically shows a schematic configuration diagram of the projection device 10. The projection device 10 comprises, in addition to the display element 12 and the projection unit 14, a light source unit 20, a lens shift mechanism 22, a light shielding member shift mechanism 24, a processor 26, and an operation unit 28.

For example, the light source unit 20 is configured as follows. The light source unit 20 includes a lamp, a rotation color filter, and an illumination optical system. The lamp emits white light. The rotation color filter includes three color filters of blue, green, and red on a circumference. In a case in which the rotation color filter rotates, the filter of each color is selectively inserted into an optical path of the white light emitted by the lamp. Therefore, the white light is selectively converted into blue light, green light, and red light in a time-division manner. The illumination optical system acts to improve the evenness of a light amount distribution in a cross section perpendicular to an optical axis with respect to the light emitted from the rotation color filter, and guides the light to the display element 12.

As the display element 12, for example, a digital micromirror device (DMD: registered trademark) can be used. The DMD is an image display element that has a plurality of micromirrors capable of changing a reflection direction of the light emitted from the light source unit 20 and in which the micromirrors are arranged two-dimensionally in pixel units. The DMD performs light modulation depending on the image by switching on and off of the reflected light of the light from the light source unit 20 by changing a direction of each micromirror depending on the image.

The projection unit 14 comprises a projection optical system 30, a light shielding member 50, and the light shielding member shift mechanism 24. The projection optical system 30 forms the projected image 18. The light shielding member 50 is a member that shields stray light. The detailed configurations of the projection optical system 30 and the light shielding member 50 will be described below.

The projection optical system 30 has a configuration in which a relative position with the display element 12 is variable. In this example, the lens shift mechanism 22 moves the projection unit 14 in parallel with respect to the display element 12 in a plane perpendicular to the optical axis of the projection optical system 30. As a result, the projection optical system 30 is moved relative to the display element 12 in a direction perpendicular to the optical axis of the projection optical system 30 (hereinafter, this operation is referred to as lens shift). Therefore, a position of the projected image 18 on the screen 16 can be shifted, and a position of the projected image 18 can be adjusted. FIG. 1 schematically shows how the projected image 18 is shifted downward with an arrow and a two-dot chain line. The lens shift mechanism 22 is configured to include, for example, an actuator (not shown) such as a solenoid or a motor.

The light shielding member 50 has a configuration in which a position is variable. In this example, the light shielding member shift mechanism 24 moves the light shielding member 50 in an optical axis direction of the projection optical system 30 and a direction perpendicular to the optical axis thereof. The light shielding member shift mechanism 24 is configured to include, for example, the actuator such as the solenoid.

The processor 26 is electrically connected to the lens shift mechanism 22 and the light shielding member shift mechanism 24. The processor 26 is, for example, a central processing unit (CPU), and controls each unit including the lens shift mechanism 22 and the light shielding member shift mechanism 24 by executing a control program in cooperation with a memory (not shown).

The operation unit 28 receives operation input from a user. The operation unit 28 is configured to include, for example, a direction instruction key. The direction instruction key is used, for example, to designate a movement direction and an amount of movement of the projection optical system 30 in the lens shift. The operation unit 28 may be provided on a main body of the projection device 10, or may be provided as a remote control device separate from the main body of the projection device 10. In a case in which the user operates the operation unit 28, an operation signal is input to the processor 26. The processor 26 controls each unit based on the operation signal.

Figure 4:
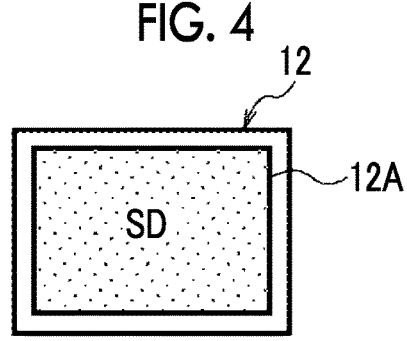
FIG. 4 is a diagram schematically showing a configuration of a display element.

Hereinafter, the main parts of the display element 12 and the projection unit 14 will be described. FIG. 4 shows the configuration of the display element 12 on the plane perpendicular to the optical axis of the projection optical system 30. The display element 12 of FIG. 4 has a rectangular shape as an example. The display element 12 has a rectangular-shaped display region 12A on which the image is displayed. In FIG. 4, the display region 12A is hatched with dots. In the present specification, an area of the display region 12A is defined as SD.

Figure 5:
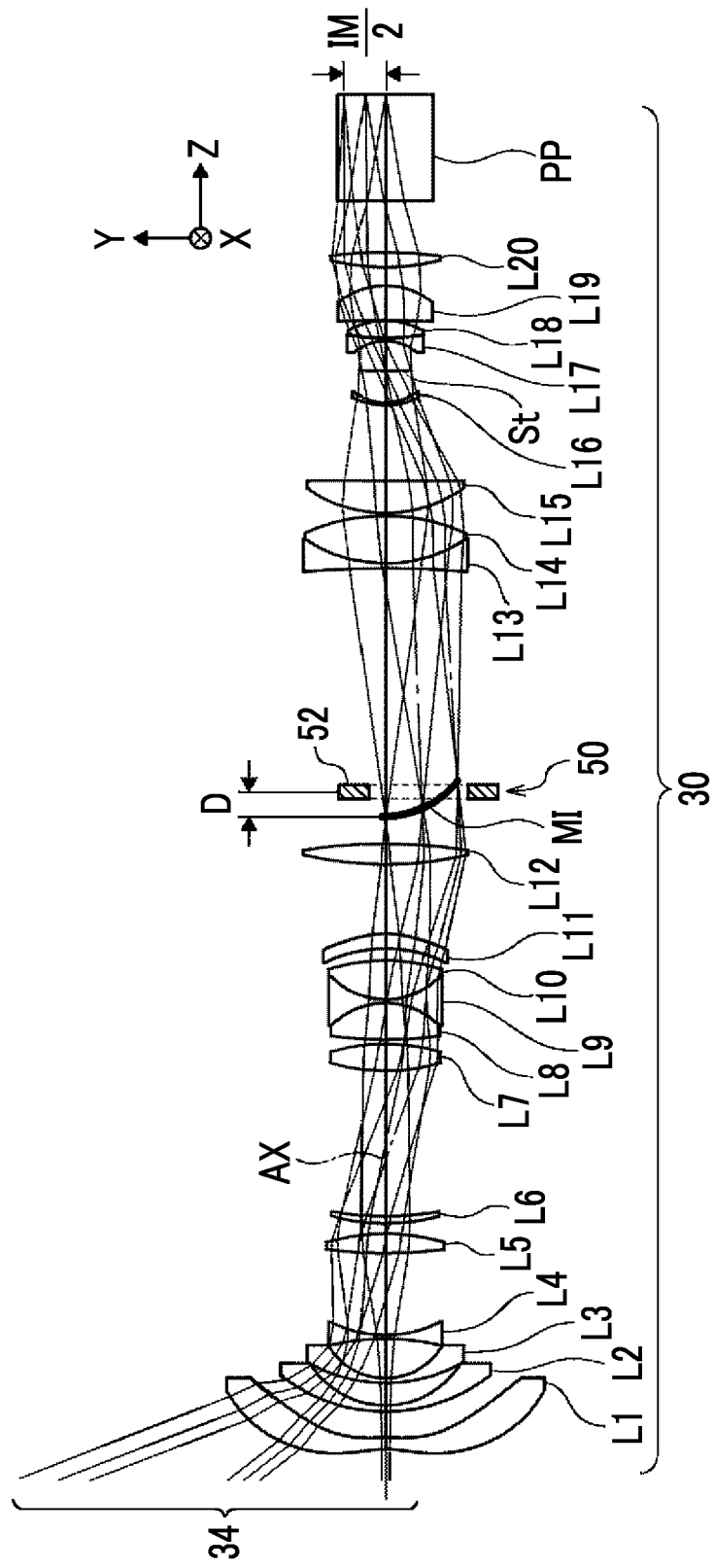
FIG. 5 is a diagram showing a cross-sectional configuration of a projection optical system and a light shielding member.

As an example, FIG. 5 shows the configuration of the projection optical system 30 in a cross section including an optical axis AX. Further, FIG. 5 schematically shows the light shielding member 50 disposed inside the projection optical system 30. In the following description of the projection optical system 30, a screen side is referred to as an enlargement side and a display element side is referred to as a reduction side. In FIG. 5, the left side is the enlargement side and the right side is the reduction side. Further, in the following description, the optical axis direction of the projection optical system 30 is a Z direction, the direction which is perpendicular to the Z direction and is a vertical direction in FIG. 5 is a Y direction, and a direction is perpendicular to both the Z direction and the Y direction is an X direction.

The projection optical system 30 comprises lenses L1 to L16, an aperture stop St, lenses L17 to L20, and an optical member PP in this order from the enlargement side to the reduction side along the optical axis AX. The aperture stop St shown in FIG. 5 does not indicate the size and the shape, and indicates the position in the optical axis direction. The optical member PP is a member that does not have a refraction power assuming a prism or the like. The optical member PP is not an essential constituent element. In the example of FIG. 5, in the Z direction, a position of a surface of the optical member PP on the reduction side coincides with a position of an image display surface of the display element 12.

FIG. 5 also shows an effective luminous flux 34 that is emitted from the display element 12, passes through the projection optical system 30, and is used to form the projected image 18. The luminous flux emitted from any point in the display region 12A of the display element 12 and used to form the projected image 18 is the effective luminous flux 34. In actual, innumerable effective luminous fluxes 34 are present, but in FIG. 5, in order to avoid complication of the drawing, the effective luminous fluxes 34 relating to three of a zero angle of view, an intermediate angle of view, and a maximum angle of view are typically shown. A height IM/2 of a main light beam of the effective luminous flux 34 having the maximum angle of view on the image display surface of the display element 12 from the optical axis AX is a radius of an image circle of the projection optical system 30 on the reduction side.

The projection optical system 30 forms an intermediate image MI of the image displayed by the display element 12 within the air space inside the projection optical system 30, and projects the intermediate image MI on the screen 16 to form the projected image 18. Such a configuration for forming the intermediate image MI is advantageous in suppressing an increase in a size of the lens on the enlargement side while ensuring a wide angle of view. In the projection optical system 30 of FIG. 5, the intermediate image MI is formed within the air space between the lens L12 and the lens L13.

As an example, the light shielding member 50 of FIG. 5 is a plate-shaped member, and is disposed such that a plate surface is perpendicular to the optical axis AX. In FIG. 5, a thickness is exaggerated for easy viewing. The thickness and the size of the light shielding member 50 shown in FIG. 5 are not accurate. The light shielding member 50 has a light shielding region 52 that shields the stray light. FIG. 5 shows a cross-sectional configuration of the light shielding member 50 in a YZ plane including the optical axis AX, and the light shielding region 52 is hatched. The light shielding region 52 is configured to be positioned outside optical paths of all the effective luminous fluxes 34. That is, the light shielding member 50 does not shield any effective luminous flux 34.

The position of the light shielding member 50 in the Z direction is the position of the intermediate image MI or the vicinity of the intermediate image MI. Specifically, the light shielding member 50 is disposed within the air space in which the intermediate image MI is formed. Stated another way, the light shielding member 50 is disposed between an optical element on the enlargement side closest to the intermediate image MI and an optical element on the reduction side closest to the intermediate image MI. The optical element herein is not limited to an optical element having power, and also includes an optical element having no power such as a plane mirror. In the example of FIG. 5, the light shielding member 50 is disposed within the air space between the lens L12 and the lens L13. By disposing the light shielding member 50 within the air space in which the intermediate image MI is formed, the effective luminous flux 34 and the stray light can be easily distinguished. In the example of FIG. 5, the light shielding member 50 may be disposed on the reduction side from a paraxial image-forming position of the intermediate image MI, but the light shielding member 50 is disposed on the enlargement side from the paraxial image-forming position of the intermediate image MI assuming that the disposition is possible.

Figure 6:
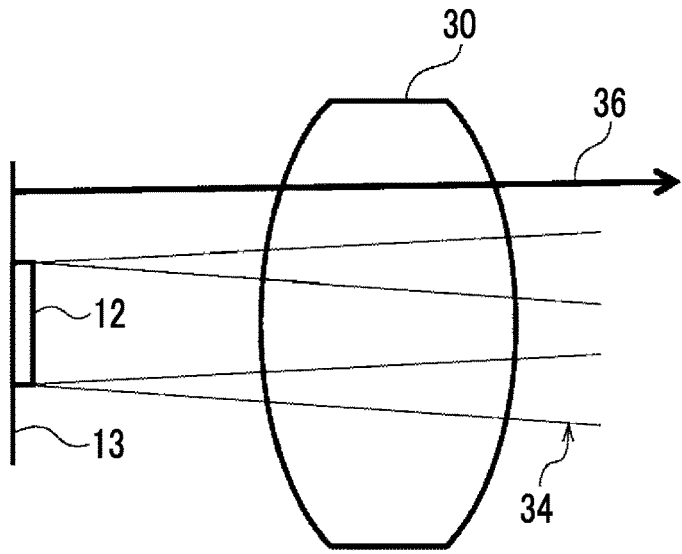
FIG. 6 is a diagram for explaining stray light.
Figure 7:
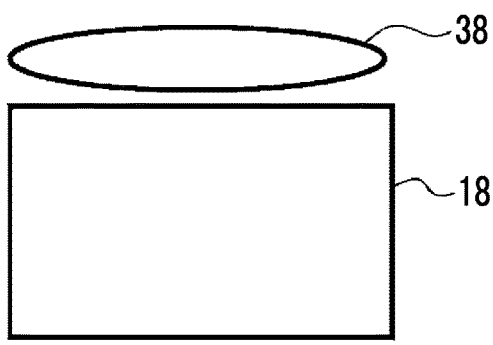
FIG. 7 is a diagram for explaining the stray light.
Figure 8:
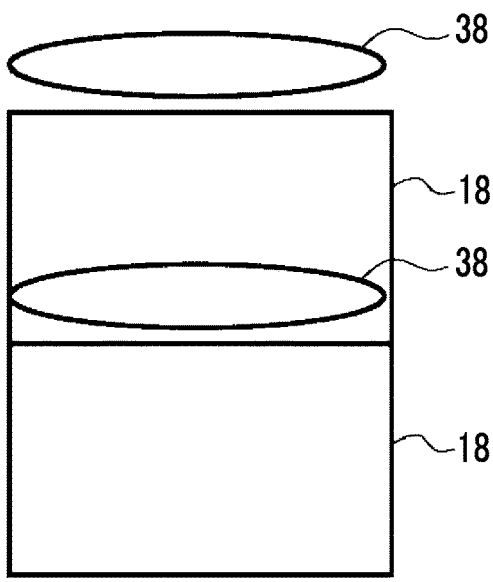
FIG. 8 is a diagram for explaining the stray light.

The stray light in the projection device in the related art will be described with reference to FIGS. 6, 7, and 8. FIGS. 6, 7, and 8 are all schematic diagrams for explanation. In the projection device, most of the light emitted from the light source unit 20 to the display element 12 is reflected by the display element 12 and passes through the projection optical system 30 to be the effective luminous flux 34. However, as shown in FIG. 6, there is a case in which a part of the light emitted from the light source unit 20 to the display element 12 is incident on a component 13 outside the display region of the display element 12, is reflected by the component 13, and passes through the projection optical system 30 to be stray light 36. For example, the component 13 is a substrate on which the display element 12 is mounted. In addition, there is a case in which a part of the light directed from the display element 12 side to the projection optical system 30 is reflected by the lens and/or a component other than the lens of the projection optical system 30, is returned to the display element 12 side, is reflected again by the component 13 and passes through the projection optical system 30 to be the stray light 36.

As shown in FIG. 7, there is a case in which the stray light 36 appears as a stray light region 38 around the projected image 18 on the screen 16. In a case in which there is only one projected image 18 on the screen 16, the stray light region 38 is outside the projected image 18, so that it may not be a big problem depending on the degree.

However, in a case in which the plurality of projected images 18 are connected or a part of the plurality of projected images 18 is overlapped as in the example shown in FIG. 2, there is a case in which the stray light region 38 is included in the projected image 18 as shown in FIG. 8. In such a case, the display quality of the projected image 18 is degraded.

Figure 9:
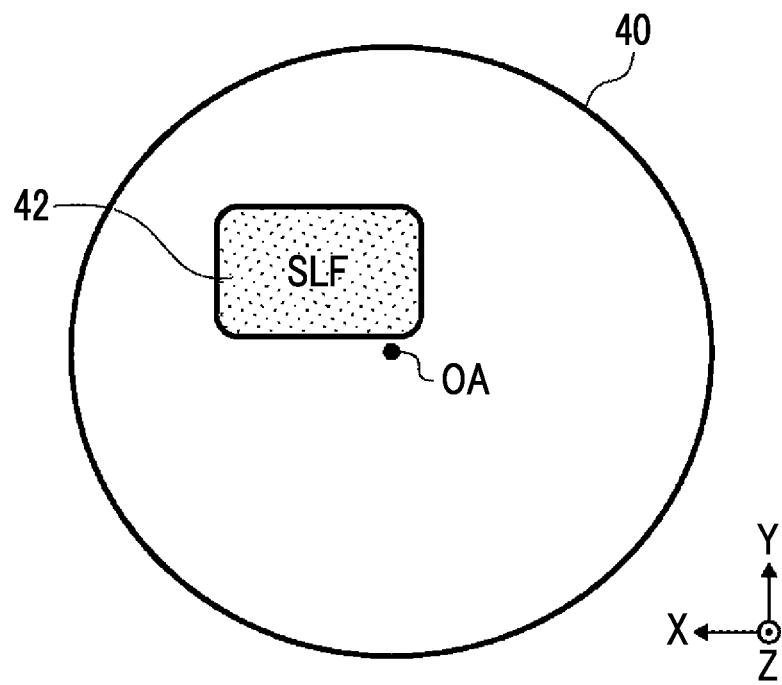
FIG. 9 is a diagram showing an effective luminous flux in a projection effective region.

In this example, in order to shield the stray light as described above, the configuration and disposition of the light shielding member 50 are suitably set. In the following description, the position in the Z direction in which the light shielding member 50 is disposed is referred to as a light shielding position for convenience. As an example, FIG. 9 shows a projection effective region 40 and an effective luminous flux 42 in an XY plane at the light shielding position. In FIG. 9, the effective luminous flux 42 is hatched with dots. The effective luminous flux 42 of FIG. 9 shows a cross section of the effective luminous flux 34 of FIG. 5 in the XY plane. In a case in which the light shielding position is the same as the position of the intermediate image MI in the Z direction, the projection effective region 40 is an image circle at the position of the intermediate image MI, and the area of the effective luminous flux 42 is the same as the area of the intermediate image MI.

In this example, the display region 12A of the display element 12 has a rectangular shape, and thus the effective luminous flux 42 also has a substantially rectangular shape. However, the effective luminous flux 42 of FIG. 9 is schematically shown, and the shape thereof is not always accurate. FIG. 9 shows an example in which the optical axis AX of the projection optical system 30 is shifted from a center of the display region 12A, and thus the center of the effective luminous flux 42 is also shifted from a center OA of the projection effective region 40. In the present specification, the area of the effective luminous flux 42 in the XY plane is defined as SLF.

Figure 10:
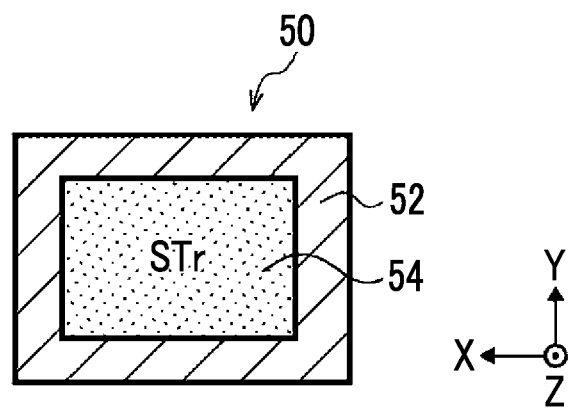
FIG. 10 is a diagram showing a configuration of the light shielding member according to the embodiment.

As an example, FIG. 10 shows the configuration of the light shielding member 50 in the XY plane. The light shielding member 50 of FIG. 10 has a rectangular-shaped outer shape.

The light shielding member 50 has a light shielding region 52 that shields the light and a light transmission region 54 through which the light is transmitted. In FIG. 10, the light shielding region 52 is hatched with diagonal lines and the light transmission region 54 is hatched with dots. The light shielding region 52 is configured by a member having a light shielding property, such as a black resin. The light transmission region 54 has a rectangular shape, and the entire circumference thereof is surrounded by the light shielding region 52. The light transmission region 54 may be formed as a hole-shaped opening, or may be made of a glass or a resin having light transmitting property. In the present specification, the terms "transmit" and "light transmitting property" regarding to the light transmission region 54 mean that a light transmittance in a usage wavelength range is 80% on average. It is more preferable that the light transmittance be 95% on average. The light transmission region 54 is configured to have the area larger than the effective luminous flux 42 at the light shielding position. In the present specification, the area of the light transmission region 54 is defined as STr.

Figure 11:
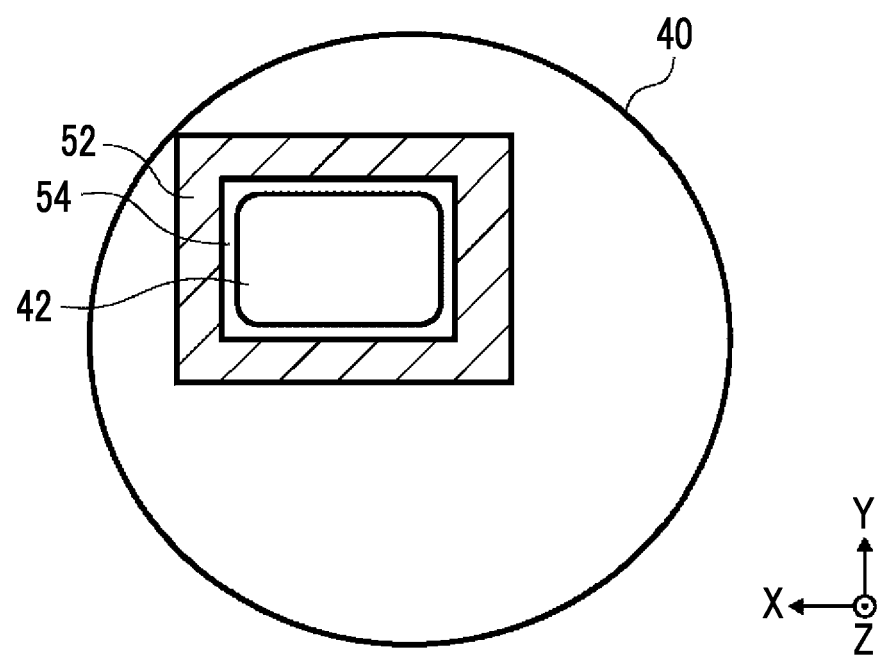
FIG. 11 is a diagram showing the effective luminous flux and the light shielding member in the projection effective region.

An example in which the light shielding member 50 of FIG. 10 is disposed in the projection effective region 40 of FIG. 9 is shown in FIG. 11. As shown in FIG. 11, the light shielding member 50 is disposed such that the effective luminous flux 42 is in the inside of the light transmission region 54 and the light shielding region 52 is positioned outside the optical paths of all the effective luminous fluxes 42. That is, all the effective luminous fluxes 42 pass through the light transmission region 54, and the light shielding region 52 does not shield the effective luminous flux 42.

Figure 12:
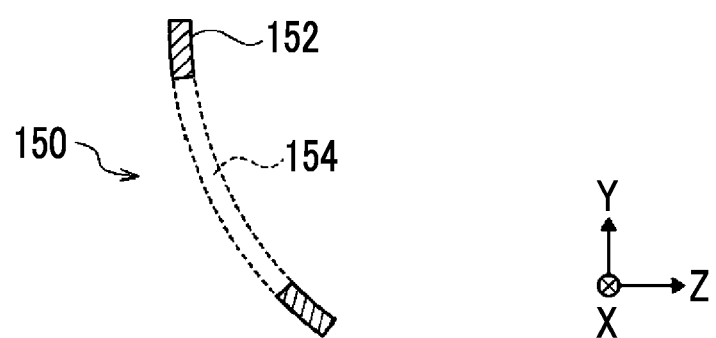
FIG. 12 is a diagram showing a configuration of a light shielding member of a modification example.

It is preferable that the shape of the light transmission region 54 be the same as that of the display region 12A of the display element 12, but the shape of the light shielding member is not limited to the above example and can be appropriately changed. The flat plate-shaped light shielding member 50 is shown in FIG. 5, but the light shielding member may have a curved shape. As an example, FIG. 12 shows a cross-sectional configuration of a light shielding member 150 having a curved shape in the YZ plane including the optical axis AX. The light shielding member 150 has a light shielding region 152 that shields the light and a light transmission region 154 through which the light is transmitted. The shape of the light shielding member 150 in the XY plane is substantially the same as that of the light shielding member 50, and the configuration in which the effective luminous flux 42 is in the inside of the light transmission region 154 is also the same. An image surface of the intermediate image MI is curved in many cases, and thus the light shielding member 150 having a curved shape is advantageous in distinguishing the effective luminous flux 42 and the stray light. Further, in a case in which the curved shape of the light shielding member 150 is formed along a field curvature of the intermediate image MI, it is more advantageous to distinguish the effective luminous flux 42 and the stray light.

It is preferable that in a case in which the area of the light transmission region 54 is defined as STr (see FIG. 10) and the area of the display region 12A of the display element 12 is defined as SD (see FIG. 4), the light shielding member 50 satisfy Conditional Expression (1) below. By preventing the light shielding member from being lower limit or less of Conditional Expression (1), the light transmission region 54 does not become too small, so that the size of the intermediate image MI can be made an appropriate size. In a case in which the size of the intermediate image MI is too small, the optical system on the enlargement side becomes larger than the intermediate image MI in the projection optical system 30 in order to enlarge the intermediate image MI and obtain the projected image 18 having a desired size. However, by preventing the light shielding member from being the lower limit or less of Conditional Expression (1), such an increase in the size of the optical system can be suppressed. By preventing the light shielding member from being upper limit or more of Conditional Expression (1), the light transmission region 54 does not become too large, so that an increase in the sizes of the optical element and the mechanical component in the vicinity of the intermediate image MI can be suppressed. In order to obtain better characteristics, it is more preferable that the light shielding member 50 satisfy Conditional Expression (1-1) below.

$$0.25 < STr/SD < 9 \tag{1}$$

$$0.4 < STr/SD < 7 \tag{1-1}$$

Further, it is preferable that in a case in which the area of the light transmission region 54 is defined as STr and the area of the effective luminous flux 42 in the plane parallel to the light transmission region 54 at the light shielding position is defined as SLF, the light shielding member 50 satisfy Conditional Expression (2) below. By preventing the light shielding member from being lower limit or less of Conditional Expression (2), the light transmission region 54 does not become extremely large with respect to the effective luminous flux 42, so that the effect of shielding the stray light generated in the vicinity of the effective luminous flux 42 can be maintained. By preventing the light shielding member from being upper limit or more of Conditional Expression (2), the light transmission region 54 does not become smaller than the effective luminous flux 42, so that the effective luminous flux 42 can be prevented from being shielded from the light. In order to obtain better characteristics, it is more preferable that the light shielding member 50 satisfy Conditional Expression (2-1) below.

$$0.5 < SLF/STr < 1 \tag{2}$$

$$0.7 < SLF/STr < 1 \tag{2-1}$$

In a case in which the light shielding member 150 having a curved shape is used as in the example shown in FIG. 12, for example, the curved shape of the light transmission region 154 may be estimated from the shape of the light shielding region 152 surrounding the light transmission region 154, the light transmission region 154 having a curved shape may be considered to be divided into a number of minute regions, and the sum of the areas of the light transmission regions 154 of the minute regions and the sum of the areas of the effective luminous fluxes 42 may be defined as STr and SLF, respectively. Alternatively, in a case in which the light shielding member 150 having a curved shape is used, the projected area obtained by projecting the light transmission region 154 on the surface perpendicular to the optical axis AX may be used as a substitute for STr, and the area of the effective luminous flux on the surface perpendicular to the optical axis AX at the light shielding position may be used as a substitute for SLF.

Further, it is preferable that in a case in which a distance between a position of the light shielding member 50 and a paraxial image-forming position of the intermediate image MI in the optical axis direction of the projection optical system 30 is defined as D and a diameter of the image circle on the reduction side of the projection optical system 30 is defined as IM, the light shielding member 50 be disposed to satisfy Conditional Expression (3) below. It is assumed that D is always a value of 0 or more. Therefore, the lower limit of Conditional Expression (3) is 0≤D/IM. By preventing the light shielding member from being the upper limit or more of Conditional Expression (3), it is advantageous to suitably distinguish the effective luminous flux 42 and the stray light. In order to obtain better characteristics, it is more preferable that the light shielding member 50 be disposed to satisfy Conditional Expression (3-1) below.

$$0 \leq D/IM < 1.5 \tag{3}$$

$$0 \leq D/IM < 1.2 \tag{3-1}$$

In a case in which the flat plate-shaped light shielding member 50 is disposed at an angle with respect to the optical axis AX, or in a case in which the light shielding member 150 having a curved shape is used as in the example shown in FIG. 12, a shortest distance between the light transmission region 154 in the optical axis direction of the projection optical system 30 and the paraxial image-forming position of the intermediate image MI is defined as D. In this case, in a case in which the light shielding member has a shape in which the light transmission region cannot be specified, the shortest distance between the light shielding member and the paraxial image-forming position of the intermediate image MI may be defined as D.

In a case in which the lens shift is performed, the corresponding values of Conditional Expression (2) above are slightly different depending on various states in which the amount of movement and the movement direction are different, but it need only satisfy Conditional Expression in at least one state and it is more preferable that Conditional Expression be satisfied in all states. This point is the same for Conditional Expression (3) above.

In this example, the positions of the light shielding member 50 in the X direction, the Y direction, and the Z direction are variable. In a case in which the lens shift is performed, the position of the effective luminous flux 42 in the XY plane is changed. Therefore, the positions of the light shielding member 50 in the X direction and the Y direction are made variable and the position of the light shielding member 50 on the XY plane is changed to follow the change in the position of the effective luminous flux 42, then the stray light can be effectively shielded.

Further, in a case in which the image surface of the intermediate image MI is curved, the stray light can be effectively shielded by making the position of the light shielding member 50 in the Z direction variable depending on the amount of movement and the movement direction of the lens shift. The image surface of the intermediate image MI in the example of FIG. 5 is curved, and the image-forming position in the Z direction due to the luminous flux in the vicinity of the optical axis is different from the image-forming position in the Z direction due to the luminous flux having the maximum angle of view. Therefore, the image-forming position of the intermediate image MI in the Z direction is different between a case in which the display region 12A of the display element 12 is positioned in the vicinity of the optical axis and a case in which the display region 12A is positioned on the peripheral portion of the image circle. The effective luminous flux 42 and the stray light can be suitably distinguished by changing the position of the light shielding member 50 in the Z direction in accordance with the relative position between the projection optical system 30 and the display region 12A in a radial direction. The "radial direction" in the description of the present specification is the radial direction in the XY plane in a case in which the optical axis AX of the projection optical system 30 is considered as the center.

Figure 13:
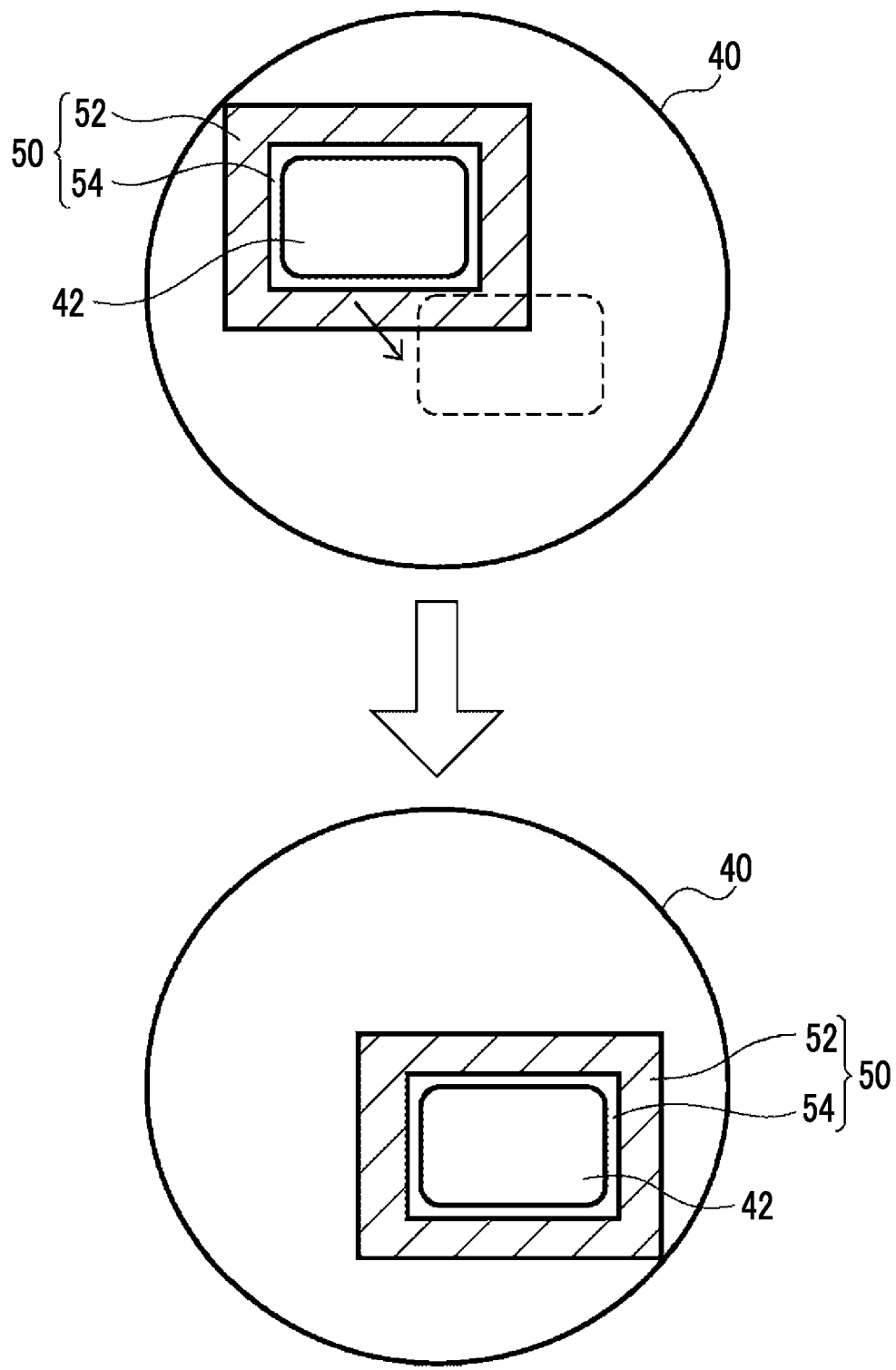
FIG. 13 is a diagram for explaining the disposition of the light shielding member in a case in which a position of the effective luminous flux is changed.

An example of setting the position of the light shielding member 50 depending on the relative position between the display element 12 and the projection optical system 30 will be described with reference to FIGS. 13 and 14. FIG. 13 shows the states of the light shielding member 50 and the effective luminous flux 42 in the XY plane at the light shielding position, as in FIG. 11. In FIG. 13, an upper portion of the white arrow indicates the state before the lens shift, and a lower portion of the white arrow indicates the state after the lens shift. Before the lens shift, the effective luminous flux 42 is positioned on the upper left of the projection effective region 40, and the light shielding member 50 is also disposed on the upper left of the projection effective region 40 such that all the effective luminous fluxes 42 can pass through the light transmission region 54.

From this state, in a case in which the user operates the direction instruction key of the operation unit 28 for the lens shift, the operation signal is input from the operation unit 28 to the processor 26. The processor 26 operates the lens shift mechanism 22 based on the operation signal. In a case in which the lens shift mechanism 22 is operated, the projection optical system 30 is shifted in the XY plane with respect to the display element 12. As a result, the effective luminous flux 42 is moved, for example, in the lower right direction of FIG. 13. In FIG. 13, the position of the effective luminous flux 42 after movement is indicated by a broken line.

Figure 14:
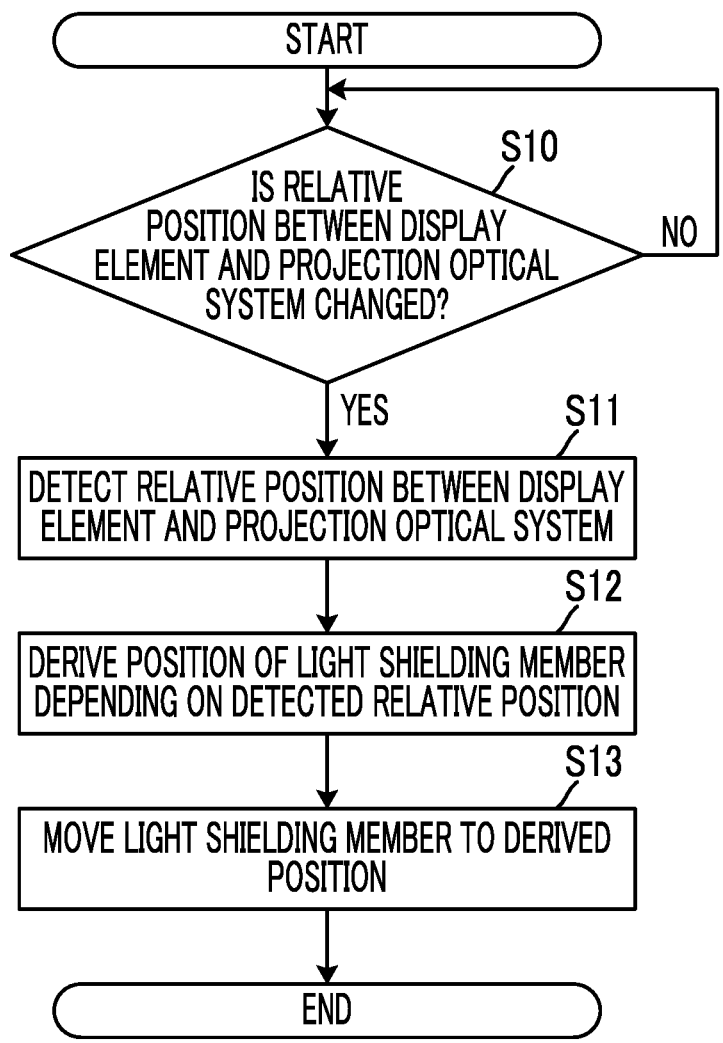
FIG. 14 is a flowchart showing a process of setting a position of the light shielding member.

In such a case, the processor 26 performs a process shown in a flowchart shown in FIG. 14, for example. While the projected image 18 is displayed, the process shown in FIG. 14 is repeatedly performed. The processor 26 monitors whether or not the relative position of the display element 12 and the projection optical system 30 is changed (step S10). The processor 26 continues monitoring while the relative position is not changed (step S10: NO). In a case in which the processor 26 determines that the relative position is changed due to the operation of the lens shift mechanism 22 (step S10: YES), the processor 26 detects the relative position between the display element 12 and the projection optical system 30 (step S11).

The processor 26 detects the relative position in the following manner. For example, the processor 26 counts drive pulses input to the actuator of the lens shift mechanism 22, and detects the amount of movement of the projection optical system 30 based on the counted number of drive pulses. In a case in which the amount of movement of the projection optical system 30 from a reference position can be detected, the relative position between the display element 12 and the projection optical system 30 can be detected. Alternatively, in a case in which the lens shift mechanism 22 is configured to include a sensor (not shown) that detects the amount of movement of the projection optical system 30, the processor 26 may detect the amount of movement based on the signal output by the sensor. For example, as the sensor, a potentiometer and a linear encoder that detect the amount of movement of the projection optical system 30 from the reference position can be used. In a case in which an output value from the sensor is an analog value, the output value is input to the processor 26 after being subjected to analog to digital (A/D) conversion.

The processor 26 derives the positions of the light shielding member 50 in the XY plane depending on the detected relative position (step S12). For example, a look-up table in which the relative position corresponds to the position of the light shielding member 50 is stored in the memory provided in the processor 26. On the look-up table, the position of the light shielding member 50, in which the effective luminous flux is in the inside of the light transmission region 54, the light shielding region 52 does not shield the effective luminous flux 42, and the stray light can be suitably shielded, is recorded for each relative position. The processor 26 derives the position of the light shielding member 50 by referring to the look-up table.

The processor 26 moves the light shielding member 50 to the derived position (step S13), and completes the process. In step S13, the processor 26 sends a control signal to the light shielding member shift mechanism 24, and the light shielding member shift mechanism 24 moves the light shielding member 50 based on the control signal. In the example of FIG. 13, the light shielding member shift mechanism 24 moves the light shielding member 50 in the lower right direction of FIG. 13. After the process is completed, as shown in the lower portion of the white arrow in FIG. 13, the effective luminous flux 42 is in the inside of the light transmission region 54, and the light shielding region 52 is positioned around the effective luminous flux 42. By setting the position of the light shielding member 50 in conjunction with the lens shift in this way, even in a case in which the lens shift is performed, a projection state in which the stray light is shielded can be easily realized.

Next, an example of setting the position of the light shielding region depending on the relative position between the display element 12 and the projection optical system 30 by using a light shielding member of a modification example will be described. FIG. 15 shows an example of the modification example. The example shown in FIG. 15 is different from the example of FIG. 13 in that the light shielding member 50 is replaced with a light shielding member 250. The outer shape of the light shielding member 250 is substantially square, and one side thereof is longer than the diameter of the projection effective region 40. The size of the light shielding member 250 is the size in which the entire projection effective region 40 can be covered.

The light shielding member 250 is a member capable of changing the position of the light shielding region by making the light transmittance variable. As an example, the light shielding member 250 has a configuration as follows. The light shielding member 250 has a configuration in which a liquid crystal element that reacts at the time of energization is interposed between two thin light transmitting members. The light transmitting member is a glass or a resin. The light shielding member 250 is connected to the processor 26 via a driving circuit (not shown). The liquid crystal element has, for example, a configuration in which a liquid crystal layer is interposed between a pair of polarizing plates, and the light transmittance is changed by changing the orientation state of the liquid crystal in the liquid crystal layer in accordance with the applied voltage value. The liquid crystal layer is divided into liquid crystal cells of a plurality of minute sections in the XY plane, for example, and the respective liquid crystal cell are arranged in a matrix. The light transmittance of the liquid crystal element is controlled for each liquid crystal cell. For example, the liquid crystal element is opaque in a state in which no voltage is applied to the liquid crystal cell, and is transparent due to the change in the orientation state of the liquid crystal in a case in which the voltage is applied to the liquid crystal cell through the driving circuit. In the liquid crystal layer, the liquid crystal cell corresponding to the section to which no voltage is applied is a light shielding region 252, and the liquid crystal cell corresponding to the section to which the voltage is applied is a light transmission region 254. In FIG. 15, the light shielding region 252 is hatched.

The light shielding member 250 can change both the position and the size of the light shielding region 252 by an electric signal, and can also change only one of the position and the size of the light shielding region 252. A portion of the light shielding member 250 other than the light transmission region 254 is the light shielding region 252. Therefore, in the light shielding member 250, changing the position or the size of the light shielding region 252 is equivalent to changing the position or the size of the light transmission region 254, respectively.

FIG. 15 shows the states of the light shielding member 250 and the effective luminous flux 42 in the XY plane at the light shielding position, as in FIG. 13. In FIG. 15, an upper portion of the white arrow indicates the state before the lens shift, and a lower portion of the white arrow indicates the state after the lens shift. The state in which the position of the effective luminous flux 42 is changed due to the lens shift in FIG. 15 is the same as in the example of FIG. 13.

After the lens shift, as shown in the lower portion of the white arrow in FIG. 15, the position of the light transmission region 254 is changed such that all the effective luminous fluxes 42 can pass through the light transmission region 254, but the position of the light shielding member 250 is fixed. That is, in this example, the positions of the light transmission region 254 and the light shielding region 252 can be set while the position of the light shielding member 250 is fixed. The overall size of the light shielding member 250 in this example is larger than that of the light shielding member 50 shown in FIG. 13. However, unlike the light shielding member 50, in this example, the light shielding member 250 can be spatially fixed. Therefore, a mechanical mechanism that spatially moves the light shielding member 50, as in the case of providing the light shielding member 50, is unnecessary. Therefore, the configuration can be simplified and the space in which the mechanical mechanism is provided can be reduced.

Figure 16:
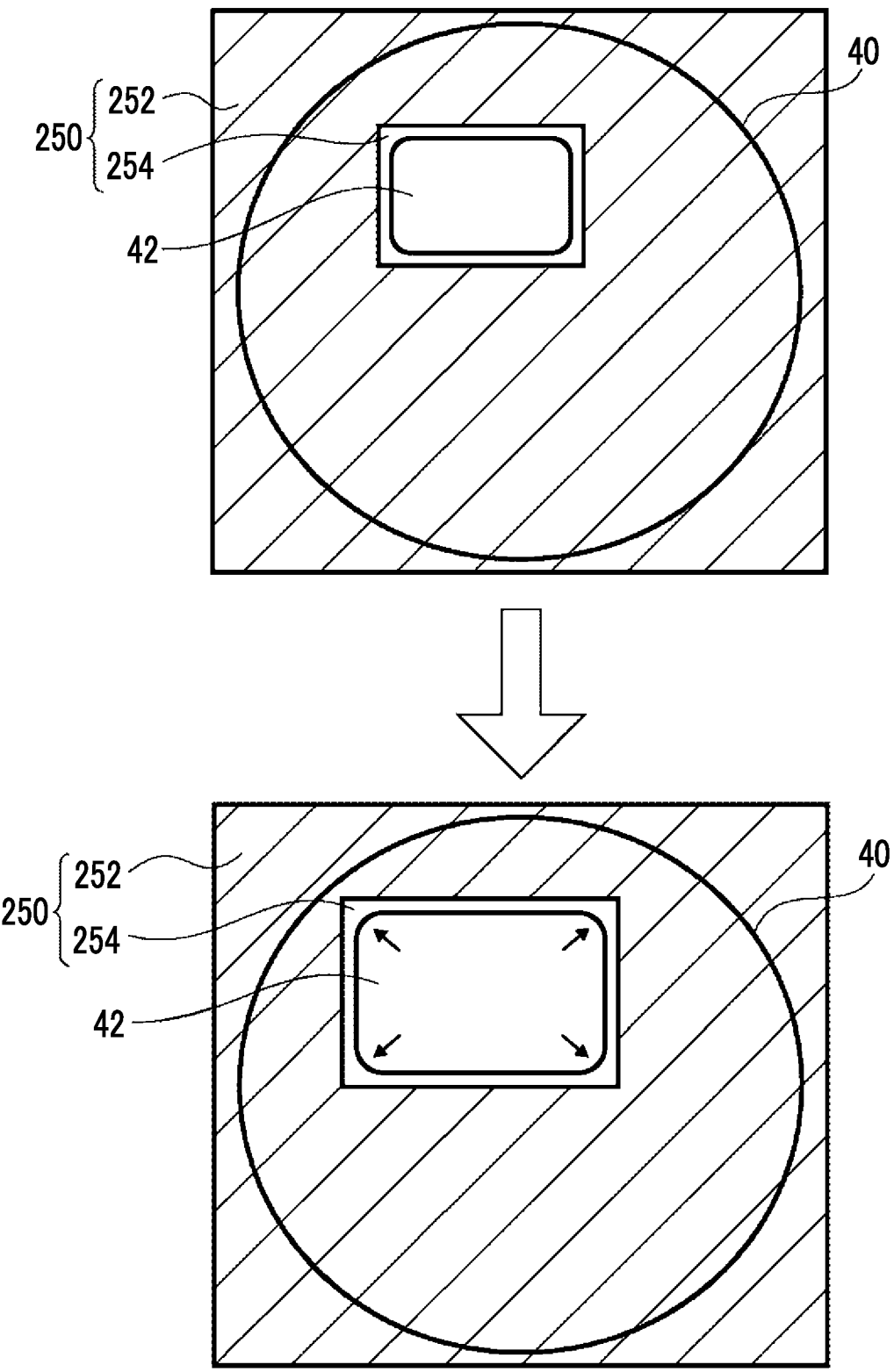
FIG. 16 is a diagram for explaining the disposition of a light shielding member of still another modification example in a case in which a size of the effective luminous flux is changed.

FIG. 16 shows an example of a change in the size of the light transmission region 254. As shown in FIG. 5, the diameter of the effective luminous flux 42 in the XY plane differs depending on the position in the Z direction, and thus in a case in which the position (light shielding position) in the Z direction in which the light shielding member 250 is disposed is changed, the size of the effective luminous flux 42 in the XY plane at the light shielding position is changed. The example of FIG. 16 assumes the above case.

FIG. 16 shows the states of the light shielding member 250 and the effective luminous flux 42 in the XY plane at the light shielding position. In FIG. 16, an upper portion of the white arrow indicates the state before the size of the effective luminous flux 42 is changed, and a lower portion of the white arrow indicates the state after the size of the effective luminous flux 42 is changed. In FIG. 16, in the lower portion of the white arrow, as compared with the upper portion, the size of the effective luminous flux 42 is large, and the size of the light transmission region 254 of the light shielding member 250 is also large in accordance with the effective luminous flux 42. The light shielding member 250 can change the size of the light transmission region 254 by the electric signal, and thus even in a case in which the size of the effective luminous flux 42 is changed, the stray light can be efficiently and easily shielded. Further, since the area of the light transmission region 254 can be changed by changing the size of the light transmission region 254, a configuration that satisfies Conditional Expressions (1) and (2) above can be easily obtained.

In the above, the case in which the position of the effective luminous flux 42 is changed and the case in which the size of the effective luminous flux 42 is changed have been described individually, but the light can also be effectively shielded by using the light shielding member 250 in a case in which both the position and the size of the effective luminous flux 42 are changed.

The case in which both the position and the size of the effective luminous flux 42 at the light shielding position are changed due to the lens shift is, for example, a case in which a non-negligible amount of distortion occurs in a case of forming the intermediate image, and the relative position between the projection optical system 30 and the display region 12A in the radial direction is shifted due to the lens shift.

Figure 17:
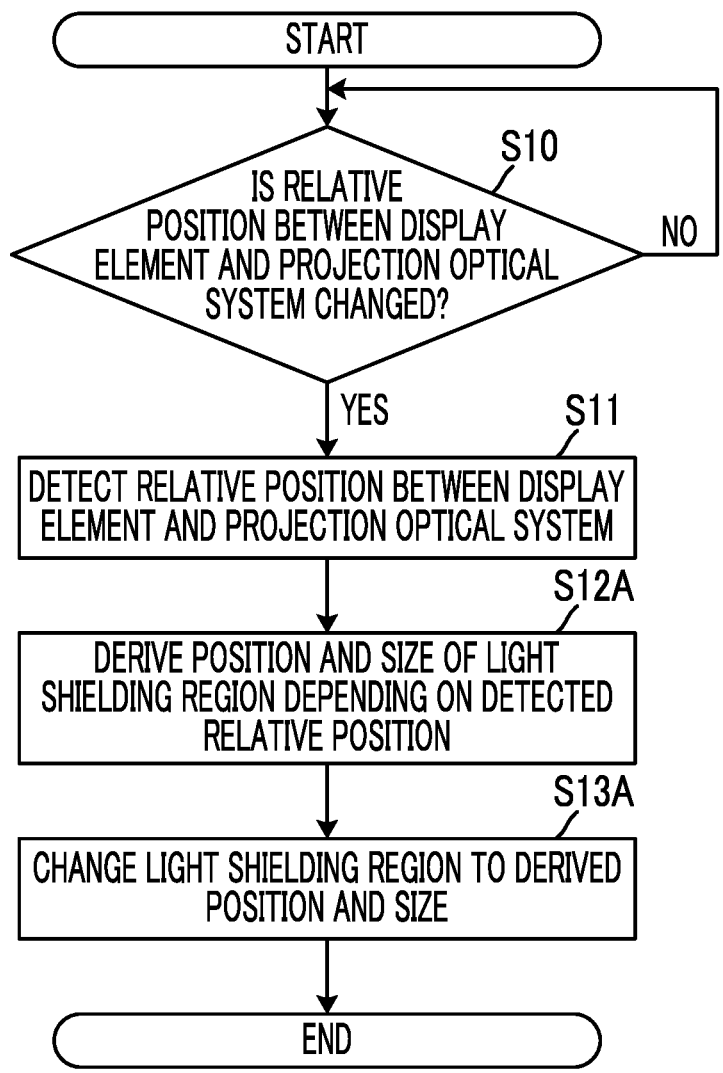
FIG. 17 is a flowchart showing a process of setting the position and the size of the light shielding member.

In such a case, for example, the processor 26 performs a process shown in a flowchart shown in FIG. 17. While the projected image 18 is displayed, the process shown in FIG. 17 is repeatedly performed. The processes of steps S10 and S11 of the flowchart in FIG. 17 are the same as the processes of the flowchart shown in FIG. 14, and thus the duplicate description will be omitted.

After the process of step S11, the processor 26 derives the position and the size of the light shielding region 252 depending on the detected relative position (step S12A). For example, a look-up table in which the relative position corresponds to the position and the size of the light shielding member 250 is stored in the memory provided in the processor 26. On the look-up table, the position and the size of the light shielding region 252, in which the effective luminous flux is in the inside of the light transmission region 254, the light shielding region 252 does not shield the effective luminous flux 42, and the stray light can be suitably shielded, are recorded for each relative position. The processor 26 derives the position and the size of the light shielding region 252 by referring to the look-up table.

The processor 26 changes the light shielding region 252 to have the derived position and size (step S13A), and completes the process. In step S13A, the processor 26 sends a control signal to the driving circuit of the light shielding member 250. The driving circuit applies or does not apply the voltage to each liquid crystal cell based on the control signal. As a result, the position and the size of the light shielding region 252 are set in conjunction with the lens shift. Also in this example, the position and the size of the light shielding region 252 can be set depending on the relative position between the display element 12 and the projection optical system 30 while the position of the light shielding member 250 is fixed. That is, the position and the area of the light transmission region 254 are automatically set depending on the relative positional relationship between the display element 12 and the projection optical system 30 while the position of the light shielding member 250 is fixed, and thus the stray light can be suitably easily shielded.

Figure 18:
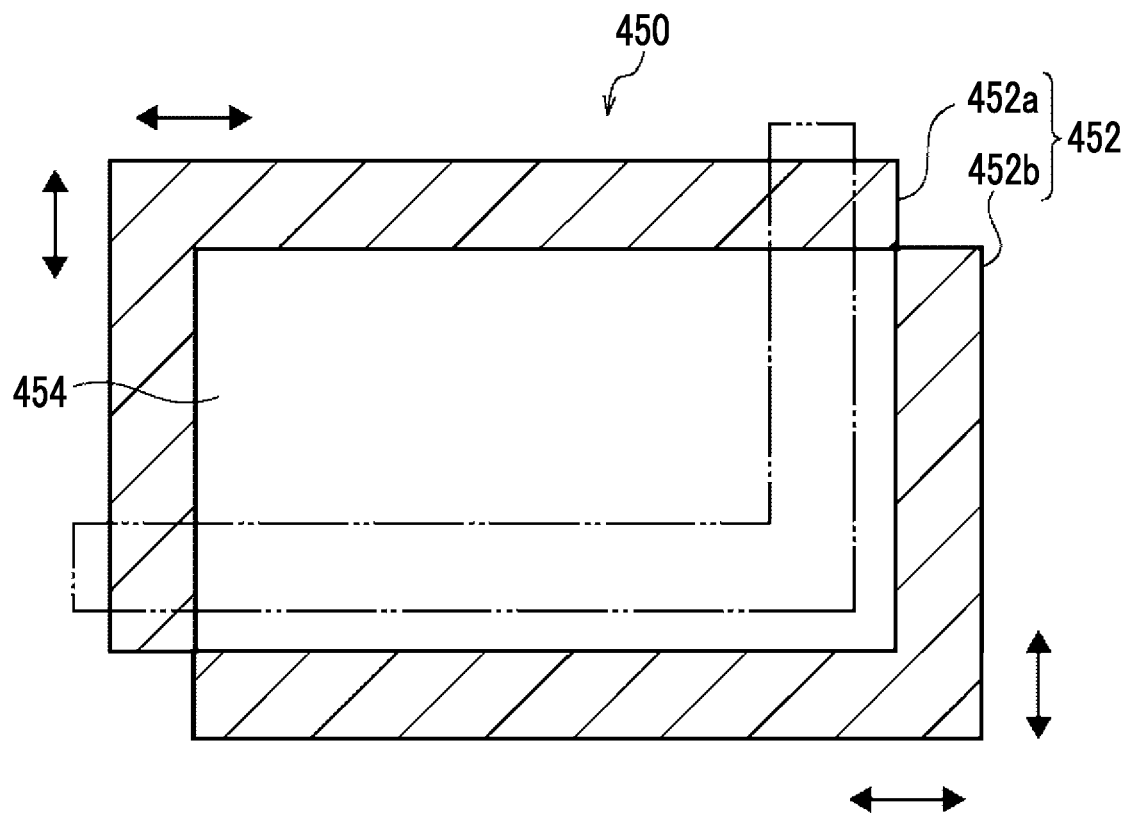
FIG. 18 is a diagram showing a configuration of a light shielding member of still another modification example.

As another example of the light shielding member of which the position and the area of the light transmission region can be changed, FIG. 18 shows a schematic configuration of a light shielding member 450. As an example, the light shielding member 450 is configured by a combination of two of a light shielding member 452a and a light shielding member 452b, which are substantially L-shaped and flat. The entire surface of the light shielding member 452a and the light shielding member 452b can shield the light, and the light shielding region 452 of the light shielding member 450 includes the light shielding member 452a and the light shielding member 452b. As shown in FIG. 18, the light shielding member 452a and the light shielding member 452b are disposed to face each other such that the L-shaped corners thereof are at diagonal positions of a rectangle. A rectangular-shaped region surrounded by the light shielding member 452a and the light shielding member 452b is the light transmission region 454. The light shielding member 452a and the light shielding member 452b have two L-shaped sides that coincide with each other in the X direction and the Y direction, and both can be moved in the X direction and the Y direction. The position and the area of the light transmission region 454 can be changed by moving at least one of the light shielding member 452a or the light shielding member 452b in at least one direction in the X direction or the Y direction. Further, by moving both the light shielding member 452a and the light shielding member 452b in the X direction and the Y direction, the area of the light transmission region 454 can be changed while the center position of the light transmission region 454 is fixed. As an example, in FIG. 18, a state in which the light shielding member 452b is moved in the X direction and the Y direction is shown by a two-dot chain line.

Next, numerical data of Example of the projection device 10 according to the presently disclosed technology will be shown. First, as the numerical data of the projection optical system 30 shown in FIG. 5, a fundamental lens data is shown in Table 1, the parameters are shown in Table 2, and aspherical coefficients are shown in Table 3. In the table shown below, numerical values rounded to predetermined digits are described. The numerical data of Examples shown below are standardized such that an absolute value of a focal length of the projection optical system 30 is 1.00, and the same performance can be exhibited even in a case in which the focal length is proportionally expanded or proportionally contracted.

In Table 1, screen is entered in the column of the surface number of the surface corresponding to the screen 16. In Table 1, the column of the surface number indicates the surface number in a case in which the surface on the enlargement side of the lens on the most enlargement side is defined as a first surface and the number thereof is increased one by one toward the reduction side, the column of the radius of curvature indicates the radius of curvature of each surface, and the column of the surface space indicates the surface space on the optical axis between each surface and the adjacent surface on the reduction side. The column of Nd indicates the refractive index of each constituent element with respect to the d line, and the column of vd indicates the Abbe number of each constituent element using the d line as a reference.

In Table 1, the sign of the radius of curvature of the surface provided with the convex surface facing the enlargement side is positive, and the sign of the radius of curvature of the surface provided with the convex surface facing the reduction side is negative. The optical member PP is also shown in Table 1. In Table 1, in each of the columns of the surface number of the surface corresponding to the paraxial image-forming position of the intermediate image MI and the aperture stop St, the words of (intermediate image) and (stop) are described together with the surface number.

Table 2 shows the absolute value of the focal length |f|, the back focus Bf at the air equivalent distance, and the F number FNo., the total angle of view 2ω, and the diameter IM of the image circle on the reduction side of the projection optical system 30. In the column of the total angle of view, [°] means that the unit is degrees. The values shown in Table 2 are values in a case in which the d line is used as a reference.

In Table 1, the surface number of the aspherical surface is marked with *, and the numerical value of the radius of curvature of the paraxial axis is described in the column of the radius of curvature of the aspherical surface. In Table 3, the column of the surface number indicates the surface number of the aspherical surface, and the columns of KA and Am (m=3, 4, 5, . . . 20) indicate the numerical value of the aspherical coefficient for each aspherical surface. The numerical value "E±n" (n: integer) of the aspherical coefficient in Table 3 means "×10$^{±n}$" KA and Am are aspherical coefficients in the aspherical equation represented by the following equation.

$$Zd = C \times h^2 / \{1 + (1 - KA \times C^2 \times h^2)^{1/2}\} + \Sigma Am \times h^m$$

Here, Zd is the aspherical depth (length of a perpendicular line drawn from a point on the aspherical surface at height h to a plane perpendicular to the optical axis in contact which the aspherical apex), h is the height (distance from the optical axis to the lens surface), C is the reciprocal of paraxial radius of curvature, KA and Am are aspherical coefficients, and X in the aspherical equation means the sum of m.

TABLE 1

Fundamental lens data

| Plane number | Radius of curvature | Spacing | Nd | vd |
|---|---|---|---|---|
| Screen | ∞ | 193.41 | | |
| *1 | −5.226 | 0.74 | 1.53158 | 55.1 |
| *2 | −14.483 | 1.67 | | |
| 3 | 10.974 | 0.39 | 1.83481 | 42.7 |
| 4 | 5.687 | 1.43 | | |
| 5 | 10.055 | 0.30 | 1.91082 | 35.3 |
| 6 | 4.228 | 2.51 | | |
| 7 | −15.278 | 0.23 | 1.72916 | 54.7 |
| 8 | 7.674 | 5.23 | | |
| 9 | 28.299 | 1.24 | 1.80610 | 33.3 |
| 10 | −13.124 | 0.64 | | |
| 11 | 12.658 | 0.47 | 1.84666 | 23.8 |

TABLE 1-continued

Fundamental lens data

| Plane number | Radius of curvature | Spacing | Nd | vd |
|---|---|---|---|---|
| 12 | 19.874 | 9.22 | | |
| 13 | 12.014 | 1.72 | 1.49700 | 81.6 |
| 14 | −12.014 | 0.25 | | |
| 15 | 24.861 | 2.35 | 1.67790 | 55.3 |
| 16 | −4.892 | 0.23 | 1.80518 | 25.5 |
| 17 | 4.892 | 2.49 | 1.49700 | 81.6 |
| 18 | −12.051 | 0.75 | | |
| *19 | −7.151 | 0.94 | 1.51007 | 56.2 |
| *20 | −5.350 | 4.41 | | |
| 21 | 22.906 | 1.33 | 1.84666 | 23.8 |
| 22 | −34.775 | 1.72 | | |
| 23 (Intermediate image) | | 15.83 | | |
| 24 | −64.712 | 0.33 | 1.80610 | 33.3 |
| 25 | 9.242 | 3.04 | 1.63854 | 55.4 |
| 26 | −12.612 | 0.17 | | |
| 27 | 8.776 | 2.05 | 1.69680 | 55.5 |
| 28 | ∞ | 4.79 | | |
| 29 | 4.673 | 0.17 | 1.59270 | 35.3 |
| 30 | 3.403 | 1.98 | | |
| 31 (Stop) | ∞ | 1.89 | | |
| 32 | −3.034 | 0.17 | 1.80518 | 25.5 |
| 33 | 12.611 | 1.11 | 1.59282 | 68.6 |
| 34 | −4.838 | 0.03 | | |
| 35 | −57.476 | 2.24 | 1.49700 | 81.6 |
| 36 | −4.717 | 1.15 | | |
| 37 | 13.843 | 0.96 | 1.92286 | 20.9 |
| 38 | −27.294 | 3.29 | | |
| 39 | ∞ | 6.78 | 1.51633 | 64.1 |
| 40 | ∞ | | | |

TABLE 2

| Parameter | |
|---|---|
| \|f\| | 1.00 |
| Bf | 7.76 |
| FNo. | 1.91 |
| 2ω[°] | 138.4 |
| IM | 5.27 |

TABLE 3

Aspherical coefficient

| Plane number | 1 | 2 | 19 | 20 |
|---|---|---|---|---|
| KA | −1.5463783E+00 | −6.9382468E+01 | −4.2607564E−01 | 5.9238030E−01 |
| A3 | 2.0188634E−02 | 3.1358694E−02 | −5.0945452E−03 | −4.0495354E−03 |
| A4 | 3.0478107E−03 | −2.9896469E−02 | 1.3118560E−02 | 1.2059833E−02 |
| A5 | −1.6698075E−02 | 3.6772078E−02 | −5.6112173E−03 | −3.7102380E−03 |
| A6 | 1.1542942E−04 | −2.9908896E−02 | −1.6330754E−03 | −6.4465878E−04 |
| A7 | 3.2492229E−05 | 1.666983 1E−02 | 2.4342264E−03 | 9.705 8579E−04 |
| A8 | −4.2531025E−06 | −6.6275160E−03 | −3.4232296E−04 | −1.0367408E−04 |
| A9 | −4.4240382E−07 | 1.9146829E−03 | −4.5272672E−04 | −1.4810355E−04 |
| A10 | 8.2458321E−08 | −4.0534017E−04 | 1.5449186E−04 | 3.7964877E−05 |
| A11 | 4.2880382E−09 | 6.2888677E−05 | 3.7074546E−05 | 1.1398645E−05 |
| A12 | −1.0095171E−09 | −7.0778056E−06 | −2.3378235E−05 | −5.1141232E−06 |
| A13 | −3.9289100E−11 | 5.6299446E−07 | −2.0299221E−07 | −1.5338201E−07 |
| A14 | 9.1888923E−12 | −2.9976192E−08 | 1.7281377E−06 | 3.2746925E−07 |
| A15 | 2.8547071E−13 | 9.4894364E−10 | −1.7564081E−07 | −3.3290055E−08 |
| A16 | −6.0738874E−14 | −1.2862398E−11 | −5.9700627E−08 | −8.9049879E−09 |
| A17 | −1.0586871E−15 | 1.5165433E−14 | 1.1131941E−08 | 1.9880145E−09 |
| A18 | 2.3574437E−16 | −4.6702764E−15 | 5.4474267E−10 | 1.7067502E−11 |
| A19 | 1.1161198E−18 | −3.1901302E−17 | −2.1807038E−10 | −3.4337789E−11 |
| A20 | −3.6582153E−19 | 1.0423640E−17 | 1.0424670E−11 | 2.3614055E−12 |

Examples 1 to 6 shown below are examples in which the light shielding member is disposed in the vicinity of the intermediate image MI or the intermediate image and the display element 12 having the rectangular-shaped display region 12A is used in the configuration shown in FIG. 5. Examples 1 to 4 are examples in which the light shielding member 50 having the same shape as that of the light shielding member shown in FIG. 10 is used. Examples 5 to 6 are examples in which an L-shaped light shielding member 550 is used.

Example 1

Figure 19A:
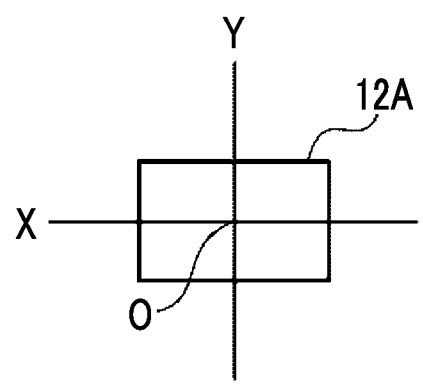
FIG. 19A is a diagram showing a position of a display region according to Example 1.
Figure 19B:
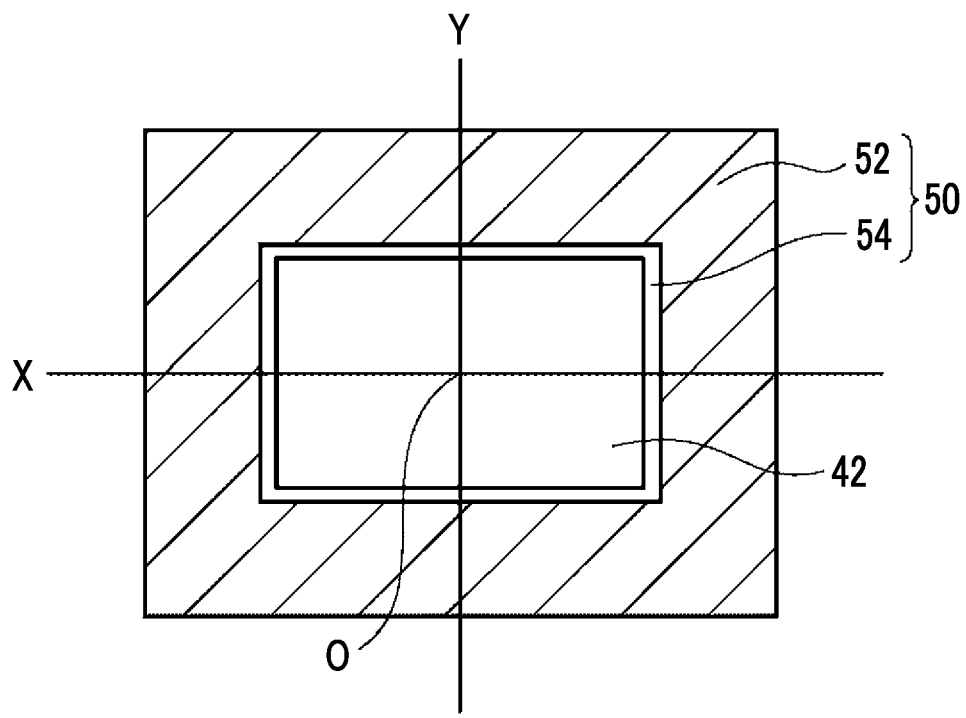
FIG. 19B is a diagram showing positions of an effective luminous flux and a light shielding member according to Example 1.

Example 1 is an example in which the optical axis AX of the projection optical system 30 coincides with the center of the display region 12A of the display element 12, and the paraxial image-forming position of the intermediate image MI in the Z direction is the same as the light shielding position. FIG. 19A shows the display region 12A and FIG. 19B shows the effective luminous flux 42 and the light shielding member 50 at the light shielding position. FIGS. 19A and 19B are views in the XY plane, and an intersection O of the X axis and the Y axis is a point on the optical axis of the projection optical system 30. The center of the display region 12A and the center of the light transmission region 54 are on the optical axis.

In the frame of Table 4, the sizes and the center positions of the display region 12A of the display element 12 and the light transmission region 54 of the light shielding member 50 are shown. The sizes in the X direction and the Y direction are the length of the long side and the length of the short side in each rectangle, respectively. The positions in the X direction and the Y direction indicate the intersection O as the origin of X=0 and Y=0. In FIGS. 19A and 19B, the sign in the X direction is negative on the left side of the intersection O and positive on the right side of the intersection O, and the sign in the Y direction is negative on the lower side of the intersection O and positive on the upper side of the intersection O. Based on the position of the intermediate image MI as the reference of Z=0, the sign in the Z direction is negative on the enlargement side from the reference and positive on the reduction side from the reduction side. The corresponding values of Conditional Expressions (1) to (3) are shown outside the frame of Table 4.

TABLE 4

| Display element | | |
|---|---|---|
| Size of display region | Y direction | 1.70 |
| | X direction | 2.70 |
| Center position of display region | Y direction | 0.00 |
| | X direction | 0.00 |
| Light shielding member | | |
| Size of light transmission region | Y direction | 3.70 |
| | X direction | 5.70 |
| Center position of light transmission region | Y direction | 0.00 |
| | X direction | 0.00 |
| | Z direction | 0.00 |

STr/SD = 4.59
SLF/STr = 0.82
D/IM = 0.00

Unless otherwise specified, the describing method and the showing method of each data in Example 1 are the same in the following Examples, and thus some duplicate descriptions will be omitted below.

Example 2

Figure 20A:
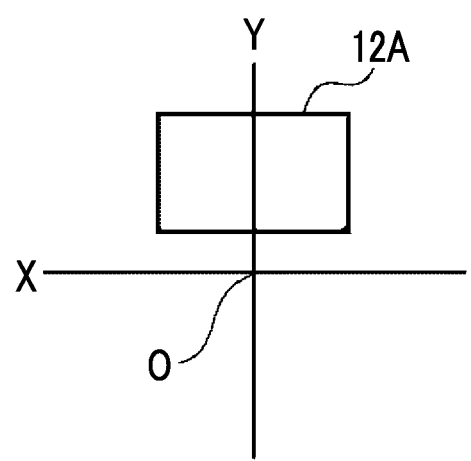
FIG. 20A is a diagram showing a position of a display region according to Example 2.
Figure 20B:
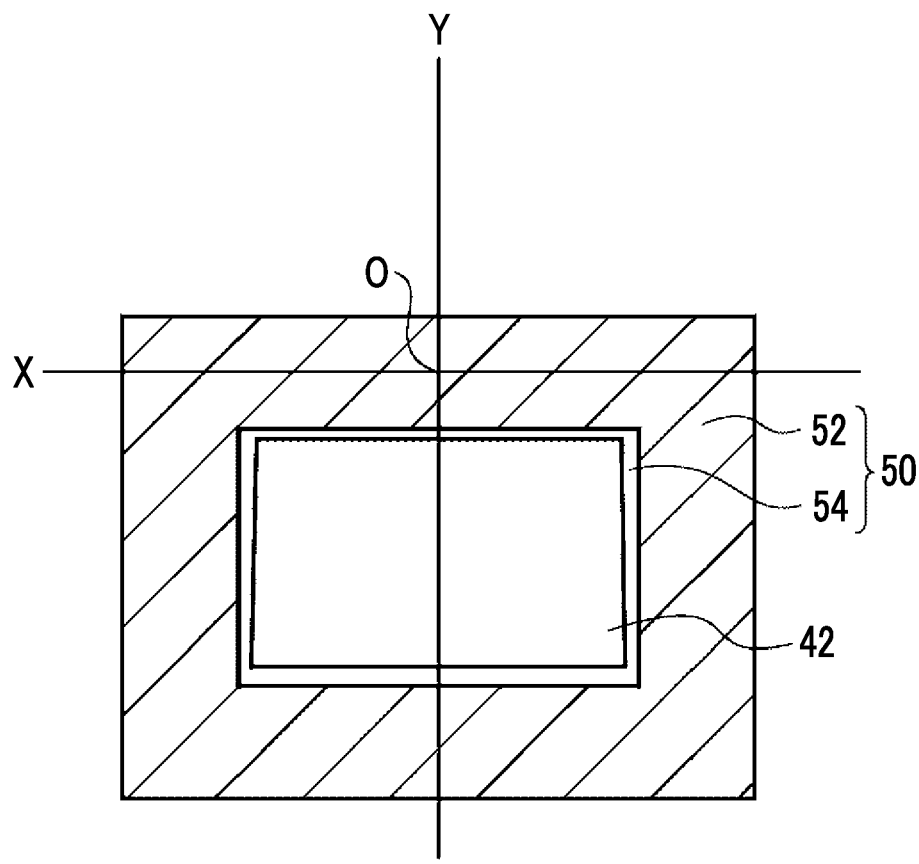
FIG. 20B is a diagram showing positions of an effective luminous flux and a light shielding member according to Example 2.

Example 2 is an example in which the center of the display region 12A of the display element 12 is shifted in the positive Y direction from the intersection O, and the paraxial image-forming position of the intermediate image MI in the Z direction is the same as the light shielding position. FIG. 20A shows the display region 12A and FIG. 20B shows the effective luminous flux 42 and the light shielding member 50 at the light shielding position. As shown in FIG. 20B, the center of the effective luminous flux 42 in the XY plane and the center of the light transmission region 54 are shifted from the intersection O in the negative Y direction. In the frame of Table 5, the sizes and the center positions of the display region 12A of the display element 12 and the light transmission region 54 of the light shielding member 50 are shown. The corresponding values of Conditional Expressions (1) to (3) are shown outside the frame of Table 5.

TABLE 5

| Display element | | |
|---|---|---|
| Size of display region | Y direction | 1.70 |
| | X direction | 2.70 |
| Center position of display region | Y direction | 1.41 |
| | X direction | 0.00 |
| Light shielding member | | |
| Size of light transmission region | Y direction | 3.70 |
| | X direction | 5.70 |
| Center position of light transmission region | Y direction | −2.70 |
| | X direction | 0.00 |
| | Z direction | 0.00 |

STr/SD = 4.59
SLF/STr = 0.82
D/IM = 0.00

Example 3

Figure 21A:
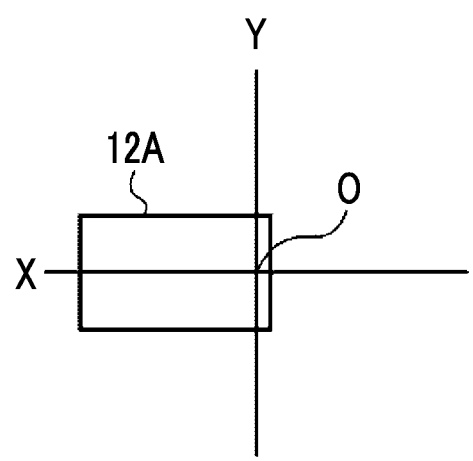
FIG. 21A is a diagram showing a position of a display region according to Example 3.
Figure 21B:
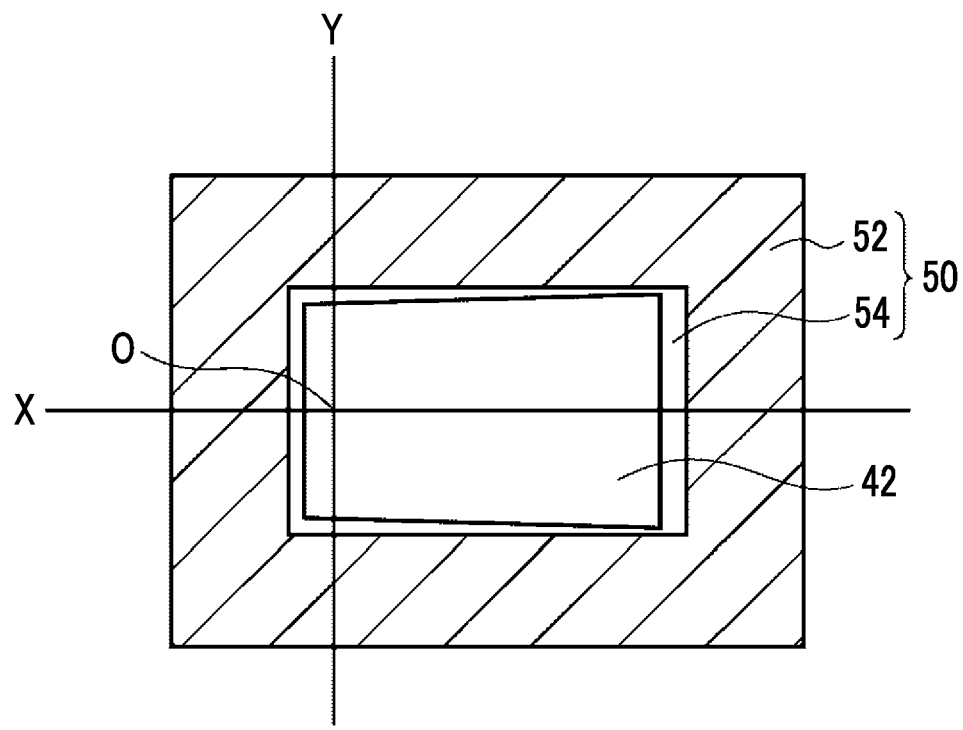
FIG. 21B is a diagram showing positions of an effective luminous flux and a light shielding member according to Example 3.

Example 3 is an example in which the center of the display region 12A of the display element 12 is shifted in the negative X direction from the intersection O, and the paraxial image-forming position of the intermediate image MI in the Z direction is the same as the light shielding position. FIG. 21A shows the display region 12A and FIG. 21B shows the effective luminous flux 42 and the light shielding member 50 at the light shielding position. As shown in FIG. 21B, the center of the effective luminous flux 42 in the XY plane and the center of the light transmission region 54 are shifted from the intersection O in the positive X direction. In the frame of Table 6, the sizes and the center positions of the display region 12A of the display element 12 and the light transmission region 54 of the light shielding member 50 are shown. The corresponding values of Conditional Expressions (1) to (3) are shown outside the frame of Table 6.

TABLE 6

| Display element | | |
|---|---|---|
| Size of display region | Y direction | 1.70 |
| | X direction | 2.70 |
| Center position of display region | Y direction | 0.00 |
| | X direction | −1.14 |
| Light shielding member | | |
| Size of light transmission region | Y direction | 3.70 |
| | X direction | 5.70 |

TABLE 6-continued

| | | |
|---|---|---|
| Center position of light transmission region | Y direction | 0.00 |
| | X direction | 2.20 |
| | Z direction | 0.00 |

STr/SD = 4.59
SLF/STr = 0.81
D/IM = 0.00

Example 4

Figure 22A:
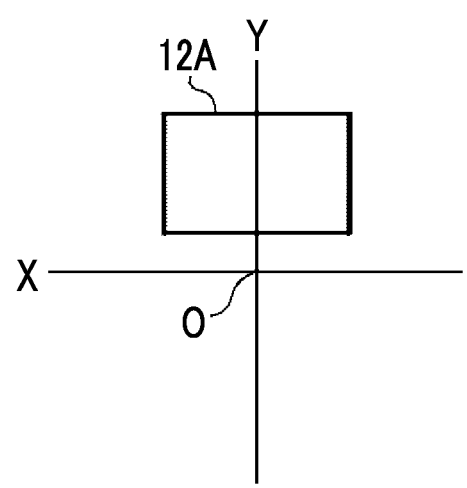
FIG. 22A is a diagram showing a position of a display region according to Example 4.
Figure 22B:
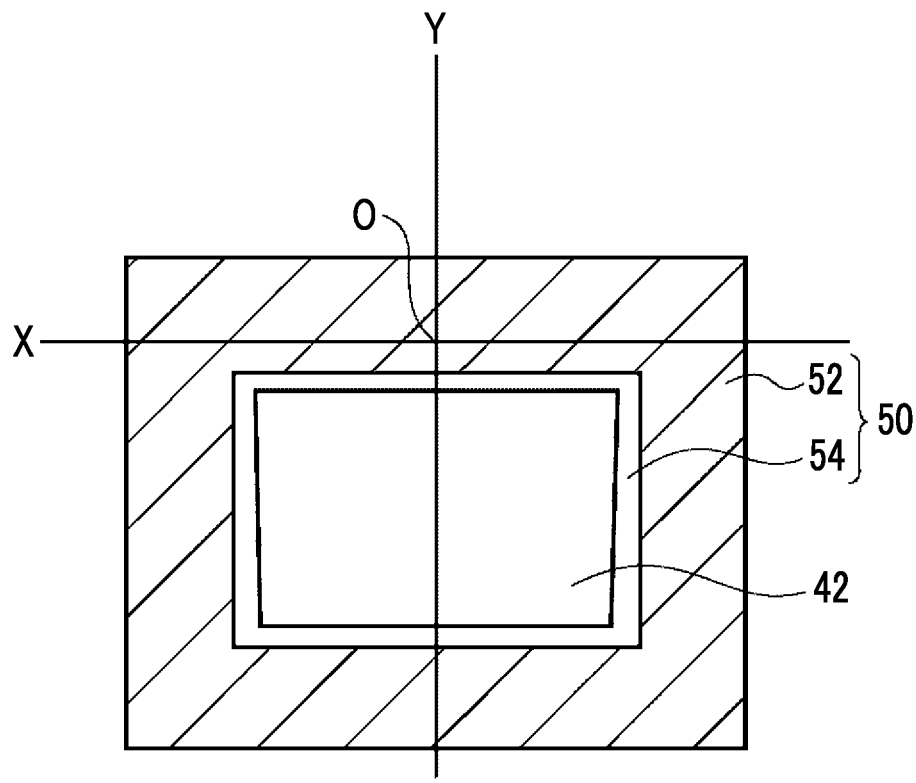
FIG. 22B is a diagram showing positions of an effective luminous flux and a light shielding member according to Example 4.

Example 4 is an example in which the center of the display region 12A of the display element 12 is shifted in the positive Y direction from the intersection O, and light shielding position is shifted to the reduction side from the paraxial image-forming position of the intermediate image MI in the Z direction. FIG. 22A shows the display region 12A and FIG. 22B shows the effective luminous flux 42 and the light shielding member 50 at the light shielding position. As shown in FIG. 22B, the center of the effective luminous flux 42 in the XY plane and the center of the light transmission region 54 are shifted from the optical axis in the negative Y direction. In the frame of Table 7, the sizes and the center positions of the display region 12A of the display element 12 and the light transmission region 54 of the light shielding member 50 are shown. The corresponding values of Conditional Expressions (1) to (3) are shown outside the frame of Table 7.

TABLE 7

| Display element | | |
|---|---|---|
| Size of display region | Y direction | 1.70 |
| | X direction | 2.70 |
| Center position of display region | Y direction | 1.41 |
| | X direction | 0.00 |
| Light shielding member | | |
| Size of light transmission region | Y direction | 3.90 |
| | X direction | 5.90 |
| Center position of light transmission region | Y direction | -2.40 |
| | X direction | 0.00 |
| | Z direction | 2.15 |

STr/SD = 5.01
SLF/STr = 0.76
D/IM = 0.41

Example 5

The light shielding member 550 of Example 5 has an L-shape as a whole, and has the same configuration as the light shielding member 452a shown in FIG. 18. In a case in which the DMD is used for the display element 12, the illumination light is emitted from an oblique direction with respect to the display element 12, such that there is a direction in which the stray light is likely to be remarkably generated and a direction in which the stray light is unlikely to be remarkably generated. In this case, even in a case in which the entire circumference of the effective luminous flux 42 is not surrounded by the light shielding region, the stray light can be effectively reduced by surrounding only a part of the circumference by the light shielding region. The light shielding member 550 is a member for which such a case is assumed.

Figure 23A:
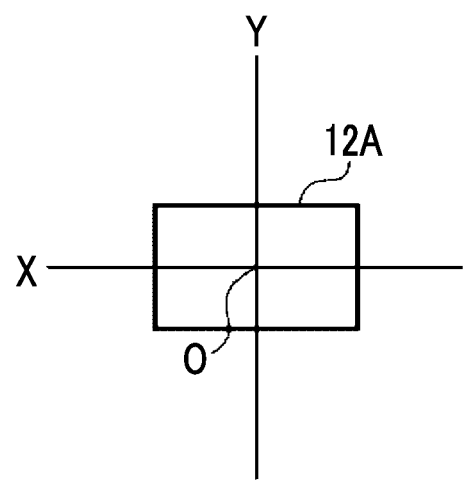
FIG. 23A is a diagram showing a position of a display region according to Example 5.
Figure 23B:
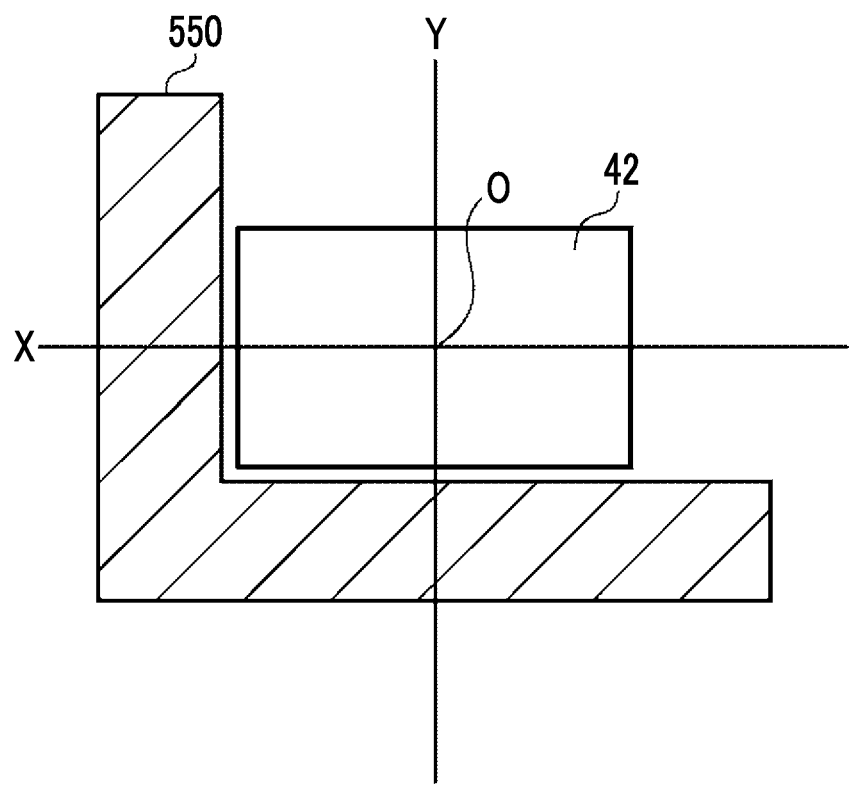
FIG. 23B is a diagram showing positions of an effective luminous flux and a light shielding member according to Example 5.

Example 5 is an example in which the intersection O coincides with the center of the display region 12A of the display element 12, and the paraxial image-forming position of the intermediate image MI in the Z direction is the same as the light shielding position. FIG. 23A shows the display region 12A and FIG. 23B shows the effective luminous flux 42 and the light shielding member 550 at the light shielding position. In the light shielding member 550, a rectangle having two sides, the longest side in the X direction and the longest side in the Y direction, which form the outer shape of the L-shape, is imaginarily considered, and the center of the rectangle is defined as an imaginary center of the light shielding member 550. The center of the display region 12A and the imaginary center of the light shielding member 550 are on the optical axis. In the frame of Table 8, the size of the display region 12A of the display element 12, the position of the display region 12A, and the position of the imaginary center of the light shielding member 550 are shown. The corresponding values of Conditional Expression (3) are shown outside the frame of Table 8.

TABLE 8

| Display element | | |
|---|---|---|
| Size of display region | Y direction | 1.70 |
| | X direction | 2.70 |
| Center position of display region | Y direction | 0.00 |
| | X direction | 0.00 |
| Light shielding member | | |
| Imaginary center position | Y direction | 0.00 |
| | X direction | 0.00 |
| | Z direction | 0.00 |

D/IM = 0.00

Example 6

Figure 24A:
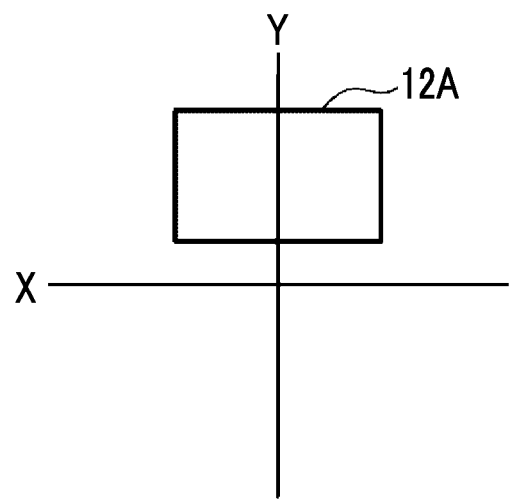
FIG. 24A is a diagram showing a position of a display region according to Example 6.
Figure 24B:
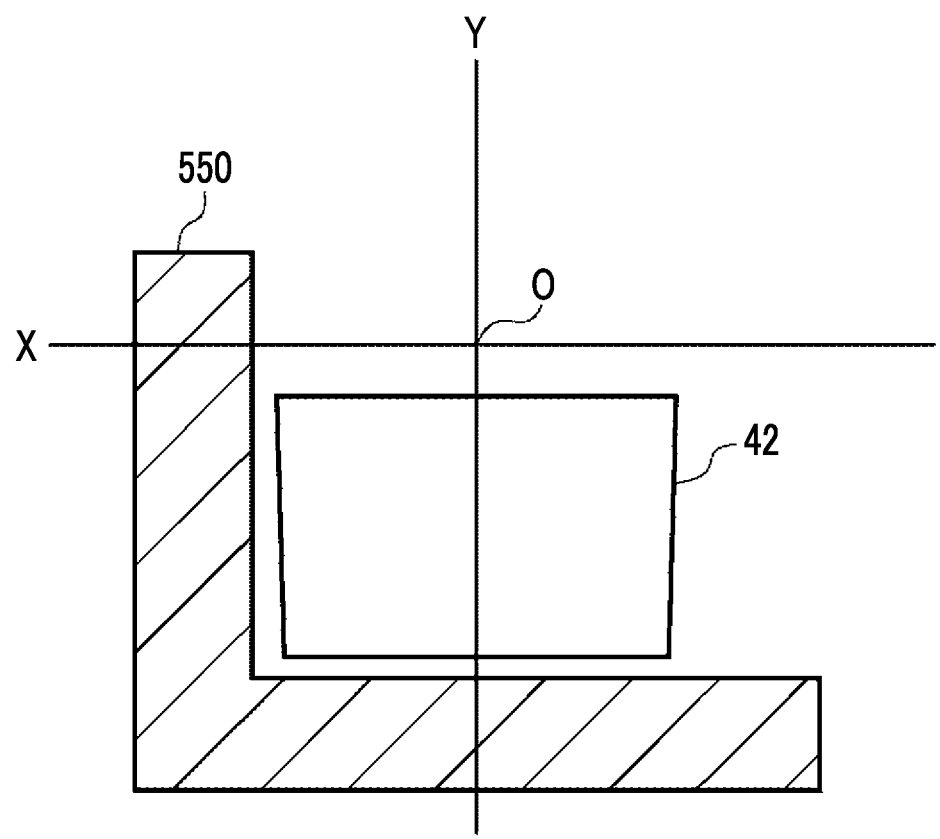
FIG. 24B is a diagram showing positions of an effective luminous flux and a light shielding member according to Example 6.

The light shielding member 550 of Example 6 is the same as the light shielding member 550 of Example 5. Example 6 is an example in which the center of the display region 12A of the display element 12 is shifted in the positive Y direction from the intersection O, and light shielding position is shifted to the reduction side from the paraxial image-forming position of the intermediate image MI in the Z direction. FIG. 24A shows the display region 12A and FIG. 24B shows the effective luminous flux 42 and the light shielding member 550 at the light shielding position. In the frame of Table 9, the size of the display region 12A of the display element 12, the position of the display region 12A, and the position of the imaginary center of the light shielding member 550 are shown. The corresponding values of Conditional Expression (3) are shown outside the frame of Table 9.

TABLE 9

| Display element | | |
|---|---|---|
| Size of display region | Y direction | 1.70 |
| | X direction | 2.70 |
| Center position of display region | Y direction | 1.41 |
| | X direction | 0.00 |
| Light shielding member | | |
| Imaginary center position | Y direction | -2.40 |
| | X direction | 0.00 |
| | Z direction | 2.15 |

D/IM = 0.41

Examples 1 to 4 include different lens shift states, but the corresponding values of Conditional Expressions (1), (2), and (3) shown in Tables 4 to 7 all satisfy each conditional expression. Further, in both Examples 5 to 6, Conditional Expression (3) is satisfied.

Figure 25:
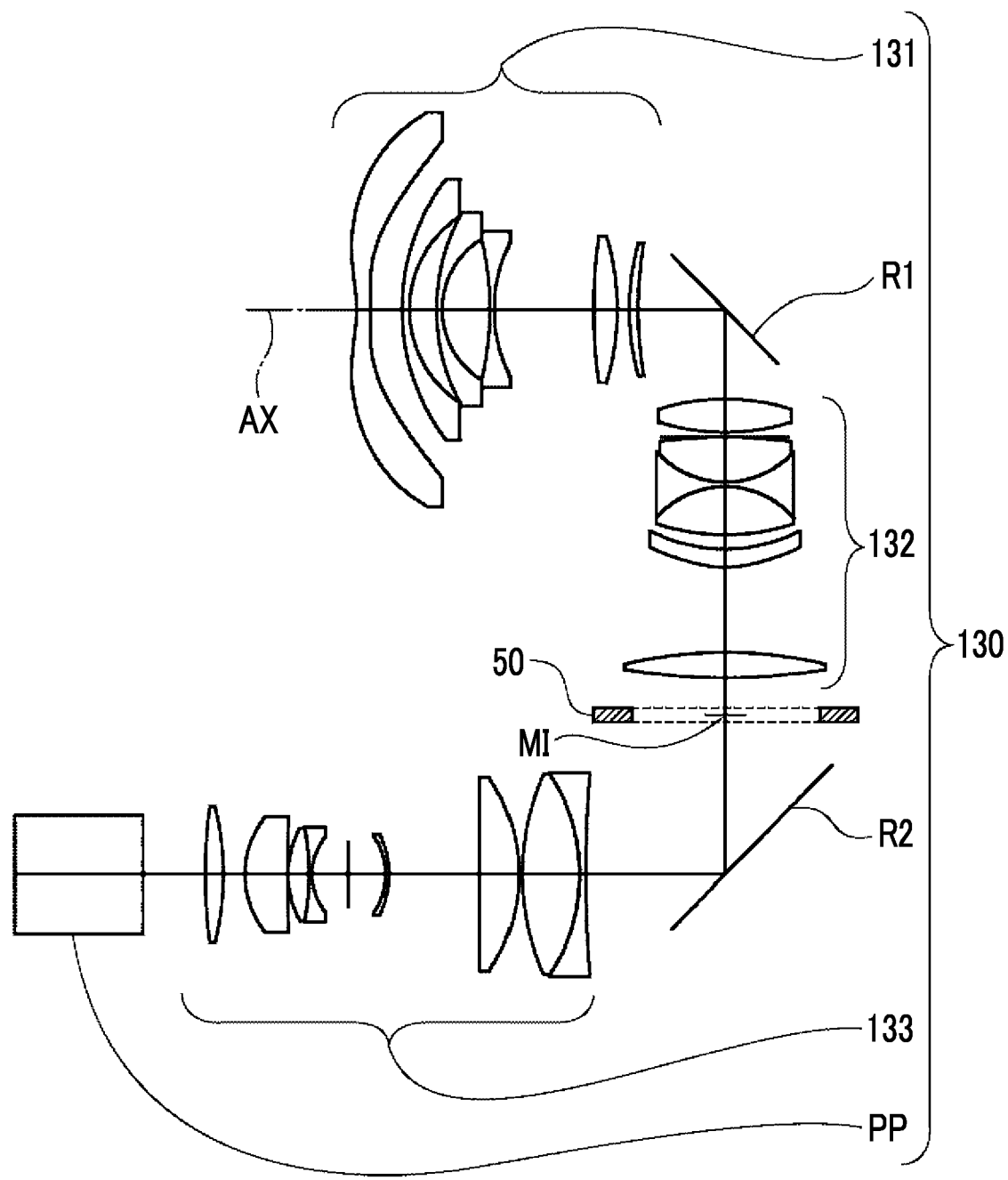
FIG. 25 is a diagram showing a configuration of a projection optical system of a modification example.

In the above embodiment, the example in which the projection optical system 30 having a linear optical path is used has been described, but a projection optical system having a bent optical path may be used. As an example, FIG. 25 shows a configuration of a projection optical system 130 having a bent optical path. The projection optical system 130 is an optical system formed by adding a reflection member that bends the optical path in the projection optical system 30. The projection optical system 130 includes a first optical system 131, a mirror R1, a second optical system 132, a mirror R2, a third optical system 133, and the optical member PP in this order from the enlargement side to the reduction side along the optical path. The first optical system 131 consists of the lenses L1 to L6 of FIG. 5. The second optical system 132 consists of the lenses L7 to L12 of FIG. 5. The third optical system 133 consists of the lenses L13 to L20 of FIG. 5. In the projection optical system 130, the intermediate image MI is formed within the air space between the lens L12 and the mirror R2. In FIG. 25, the intermediate image MI is shown only in the vicinity of the optical axis. The light shielding member 50 in FIG. 25 is disposed such that the position thereof in the optical axis direction coincides with the paraxial image-forming position of the intermediate image MI.

The modification example of the projection optical system is not limited to the example shown in FIG. 25, and various modifications can be made. The number of times the optical path is bent and the bending direction in the bent optical path can be optionally selected within a possible range. Further, the radius of curvature, the surface space, the refractive index, the Abbe number, the aspherical coefficient, and the like of each optical element such as a lens consisting the projection optical system are not limited to the values shown in each of Examples above, and other values may be adopted.

In the description of the lens shift of the above embodiment, an example in which the relative position between the entire projection optical system and the display element 12 is made variable has been described, but the relative position between a part of the projection optical system and the display element 12 may be variable. That is, the relative position between at least a part of the projection optical system and the display element 12 need only be variable. Further, in the description of the lens shift of the above embodiment, an example in which the relative position between the display element 12 and the projection optical system is made variable by moving the projection optical system with respect to the display element 12 has been described, but the relative position between the display element 12 and the projection optical system may be made variable by moving the display element 12 with respect to the projection optical system.

In the description based on the flowchart in FIG. 17, an example in which the position and the size of the light shielding region of the light shielding member 250 are automatically set at the time of lens shift has been described, but another method can be adopted. For example, after step S12A, the processor 26 may present the derived position and size to the user, and the user may adjust the light shielding member to have the presented position and size. In this case, the projection device 10 comprises a mechanism that manually adjusts the light shielding member instead of or in addition to the actuator.

Alternatively, a plurality of types of the light shielding members having different positions and sizes of the light transmission region may be attachable to and detachable from the projection device 10, and the user may perform replacing of the plurality of types of light shielding members. In this case, for example, a lens barrel portion of the projection optical system comprises a slot in which the plurality of types of light shielding members can be selectively inserted and removed. The user attaches the light shielding member to the projection optical system by inserting the selected light shielding member into the slot. In this case, it is preferable that the projection device 10 comprise a mechanism that presents the optimum light shielding member to be attached to the user. For example, as in the projection device 10 of the above examples, the look-up table in which the relative position between the display element 12 and the projection optical system and each of the plurality of types of light shielding members correspond to each other is stored. Then, after the same step as step S11 shown in FIG. 14, the processor 26 presents the optimum light shielding member among the plurality of types of light shielding members to the user by displaying the optimum light shielding member on a display unit (not shown) by referring to the look-up table. The user selects and attaches the optimum light shielding member which is presented.

As the display element 12, a light transmission type display element using a liquid crystal display device (LCD) may be used instead of the DMD. Further, instead of the DMD, a self-luminous element such as a light emitting diode (LED) or an organic light emitting diode (OLED) may be used.

In the above embodiment, an example in which the lamp is used as the light source has been described, but the present disclosure is not limited to this, and the LED or a laser light source may be used.

In the above embodiment, various processors as follows can be used as the processor. Various processors include the CPU, which is a general-purpose processor that functions by executing a software (program), as well as a processor such as a field programmable gate array (FPGA) of which a circuit configuration can be changed after manufacturing. The FPGA includes a programmable logic device (PLD) or a dedicated electric circuit which is a processor having a circuit configuration specially designed for executing specific processing such as an application specific integrated circuit (ASIC), and the like. The processor may be configured by one of these various processors or a combinations of two or more processors of the same type or different types (for example, a combination of a plurality of FPGAs, or a combination of the CPU and the FPGA). The hardware structure of these various processors is, more specifically, an electric circuit in which circuit elements such as semiconductor elements are combined.

In the presently disclosed technology, the above embodiment and various modification examples can be combined with each other as long as there is no contradiction. Further, the present disclosure is not limited to the above embodiment, various configurations can be adopted as long as the configuration does not deviate from the gist.

A first preferable aspect of the presently disclosed technology is a projection device comprising a display element that displays an image, a projection optical system that forms an intermediate image of the image within an air space and projects the intermediate image to form a projected image, and a light shielding member that is disposed within the air space, in which the light shielding member includes a light shielding region which is positioned outside optical paths of all effective luminous fluxes emitted from the display element and used to form the projected image, and a light transmission region which is surrounded by the light shielding region and through which the effective luminous flux is transmitted, and Conditional Expression (1) above is satisfied.

A second preferable aspect of the presently disclosed technology is a projection device comprising a display element that displays an image, a projection optical system that forms an intermediate image of the image within an air space and projects the intermediate image to form a projected image, and a light shielding member that is disposed within the air space and includes a light shielding region which is positioned outside optical paths of all effective luminous fluxes emitted from the display element and used to form the projected image, Conditional Expression (3) above is satisfied.

The contents described and shown above are detailed description of the parts relating to the presently disclosed technology, and are merely an example of the presently disclosed technology. For example, the above descriptions of the configuration, the function, the action, and the effect are description of the examples of the configuration, the function, the action, and the effect of the parts of the presently disclosed technology. Therefore, it should be noted that unnecessary parts may be deleted, new elements may be added, or replacements may be made to the contents described and shown above within a range that does not deviate from the gist of the presently disclosed technology. In addition, in order to avoid complications and facilitate understanding of the parts relating to the presently disclosed technology, in the contents described and shown above, descriptions of common general knowledge and the like that do not require special explanation for enabling the implementation of the presently disclosed technology are omitted.

All of the documents, the patent applications, and the technical standards described in the present specification are incorporated in the present specification by reference to the same extent as a case in which each individual document, patent application, and technical standard are specifically and individually noted to be incorporated by reference.

What is claimed is:

1. A projection device comprising:
a display element that displays an image;
a projection optical system that forms an intermediate image of the image within an air space and projects the intermediate image to form a projected image; and
a light shielding member that is disposed within the air space,
wherein the light shielding member includes a light shielding region which is positioned outside optical paths of all effective luminous fluxes emitted from the display element and used to form the projected image, and a light transmission region which is surrounded by the light shielding region and through which the effective luminous flux is transmitted, and
in a case in which an area of the light transmission region is defined as STr and an area of a display region of the display element is defined as SD, Conditional Expression (1) is satisfied, which is represented by $$0.25 < STr/SD < 9 \tag{1}.$$

2. The projection device according to claim 1,
wherein in a case in which an area of the effective luminous flux in a plane parallel to the light transmission region at a position at which the light shielding member is disposed is defined as SLF, Conditional Expression (2) is satisfied, which is represented by $$0.5 < SLF/STr < 1 \tag{2}.$$

3. The projection device according to claim 1,
wherein in a case in which a distance between a position of the light shielding member and a paraxial image-forming position of the intermediate image in an optical axis direction of the projection optical system is defined as D and a diameter of an image circle on a reduction side of the projection optical system is defined as IM, Conditional Expression (3) is satisfied, which is represented by $$0 \le D/IM < 1.5 \tag{3}.$$

4. The projection device according to claim 1,
wherein the area of the light transmission region is set depending on a relative positional relationship between the display element and the projection optical system.

5. The projection device according to claim 1,
wherein a relative position between at least a part of the projection optical system and the display element is variable.

6. The projection device according to claim 1,
wherein a position of the light shielding member is variable.

7. The projection device according to claim 1,
wherein a position of the light shielding member is set depending on a relative position between the display element and the projection optical system.

8. The projection device according to claim 1,
wherein the light shielding member is able to change a position of the light shielding region by making a light transmittance variable, and
the position of the light shielding member is set depending on a relative position between the display element and the projection optical system while the position of the light shielding region is fixed.

9. The projection device according to claim 1,
wherein the light shielding member has a curved shape.

10. The projection device according to claim 1,
wherein Conditional Expression (1-1) is satisfied, which is represented by $$0.4 < STr/SD < 7 \tag{1-1}.$$

11. The projection device according to claim 2,
wherein Conditional Expression (2-1) is satisfied, which is represented by $$0.7 < SLF/STr < 1 \tag{2-1}.$$

12. A projection system comprising:
a plurality of the projection devices according to claim 1; and
a control device that performs control of linking the plurality of projection devices.

13. A projection device comprising:
a display element that displays an image;
a projection optical system that forms an intermediate image of the image within an air space and projects the intermediate image to form a projected image; and
a light shielding member that is disposed within the air space and includes a light shielding region which is positioned outside optical paths of all effective luminous fluxes emitted from the display element and used to form the projected image,
wherein in a case in which a distance between a position of the light shielding member and a paraxial image-forming position of the intermediate image in an optical axis direction of the projection optical system is defined as D and a diameter of an image circle on a reduction side of the projection optical system is defined as IM, Conditional Expression (3) is satisfied, which is represented by $$0 \leq D/IM < 1.5 \tag{3}$$

14. The projection device according to claim 13, wherein a relative position between at least a part of the projection optical system and the display element is variable.

15. The projection device according to claim 13, wherein a position of the light shielding member is variable.

16. The projection device according to claim 13, wherein a position of the light shielding member is set depending on a relative position between the display element and the projection optical system.

17. The projection device according to claim 13, wherein the light shielding member is able to change a position of the light shielding region by making a light transmittance variable, and the position of the light shielding member is set depending on a relative position between the display element and the projection optical system while the position of the light shielding region is fixed.

18. The projection device according to claim 13, wherein the light shielding member has a curved shape.

19. The projection device according to claim 13, wherein Conditional Expression (3-1) is satisfied, which is represented by $$0 \leq D/IM < 1.2 \tag{3-1}$$

20. A projection system comprising:
a plurality of the projection devices according to claim 13; and
a control device that performs control of linking the plurality of projection devices.

* * * * *